United States Patent
Jain et al.

(10) Patent No.: US 11,934,700 B2
(45) Date of Patent: Mar. 19, 2024

(54) FUSED COMMAND HANDLING

(71) Applicant: Western Digital Technologies, Inc., San Jose, CA (US)

(72) Inventors: Rahul Jain, Karnataka (IN); Arvind Kumar V M, Karnataka (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 36 days.

(21) Appl. No.: 17/720,106

(22) Filed: Apr. 13, 2022

(65) Prior Publication Data

US 2023/0333775 A1 Oct. 19, 2023

(51) Int. Cl.
*G06F 3/06* (2006.01)
*G06F 12/02* (2006.01)

(52) U.S. Cl.
CPC .......... *G06F 3/0659* (2013.01); *G06F 3/0614* (2013.01); *G06F 3/0673* (2013.01); *G06F 12/0223* (2013.01)

(58) Field of Classification Search
None
See application file for complete search history.

(56) References Cited

U.S. PATENT DOCUMENTS

| 10,761,775 B2 | 9/2020 | Kachare et al. |
| 10,915,267 B2 | 2/2021 | Trika et al. |
| 2019/0278523 A1* | 9/2019 | Benisty .................. G06F 3/061 |

FOREIGN PATENT DOCUMENTS

| CN | 111813345 A | 10/2020 |
| CN | 112363762 A | 2/2021 |

* cited by examiner

*Primary Examiner* — Brian R Peugh
(74) *Attorney, Agent, or Firm* — ArentFox Schiff LLP

(57) ABSTRACT

Aspects of a storage device are provided that handle pairing and atomic processing of fused commands received from submission queues based on data structures such as a linked lists which the controller respectively associates with each submission queue. A memory of the storage device includes a plurality of data structures each associated with a different submission queue. A controller of the storage device receives a first command for a fused operation from a submission queue, stores the first command in a data structure, receives a second command for the fused operation from the submission queue, determines whether the second command corresponds to the fused operation, stores the second command in the data structure in response to the determination, and performs the fused operation in response to storing the second command. As a result, fused command handling may be achieved with minimal impact to queue arbitration logic and command latency.

18 Claims, 12 Drawing Sheets

FUSED COMMAND HANDLING

BACKGROUND

Field

This disclosure is generally related to electronic devices and more particularly to storage devices.

Introduction

Storage devices enable users to store and retrieve data. Examples of storage devices include non-volatile memory devices. A non-volatile memory generally retains data after a power cycle. An example of a non-volatile memory is a flash memory, which may include array(s) of NAND cells on one or more dies. Flash memory may be found in solid-state devices (SSDs), Secure Digital (SD) cards, and the like.

Storage devices may retrieve or store data from flash memory in a fused operation or command. An example of a fused operation is a compare and write. During a compare and write, the storage device compares data received from a host with data stored in the memory, and if the data are the same (the compare passes), the storage device writes new host data to the memory to replace the old compared data. Otherwise, if the compare fails (the data are not the same), the storage device does not process the write.

SUMMARY

One aspect of a storage device is disclosed herein. The storage device includes a memory and a controller. The memory includes a data structure associated with a submission queue. The controller is configured to receive a first command for a fused operation from the submission queue, to store the first command in the data structure, to receive a second command from the submission queue, to determine whether the second command corresponds to the fused operation, to store the second command in the data structure in response to determining that the second command corresponds to the fused operation, and to perform the fused operation in response to storing the second command.

Another aspect of a storage device is disclosed herein. The storage device includes a memory and a controller. The memory includes a data structure associated with a submission queue. The controller is configured to receive a first command for a fused operation from the submission queue, to store the first command in the data structure, to receive a second command for a different operation from the submission queue, to determine whether the second command corresponds to the fused operation, and in response to determining that the second command does not correspond to the fused operation, to perform the different operation prior to the fused operation.

A further aspect of a storage device is disclosed herein. The storage device includes a memory and a controller. The memory includes a plurality of data structures each associated with a different submission queue. The controller is configured to receive a first command for a fused operation from one of the different submission queues, to store the first command in one of the data structures, to receive a second command for the fused operation from the one of the different submission queues, to determine whether the second command corresponds to the fused operation, to store the second command in the one of the data structures in response to determining that the second command corresponds to the fused operation, and to perform the fused operation in response to storing the second command.

It is understood that other aspects of the storage device will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1:
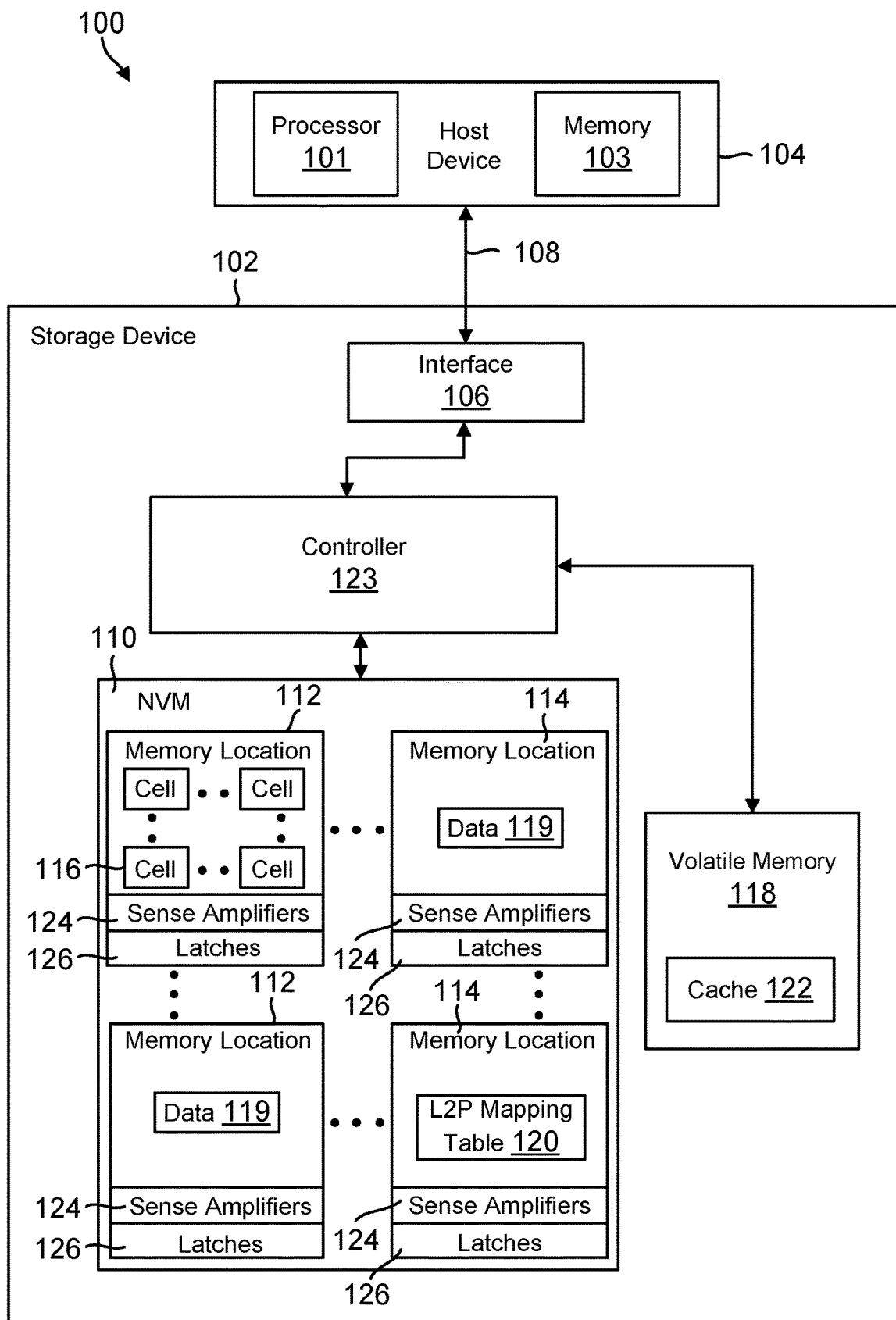
FIG. 1 is a block diagram illustrating an exemplary embodiment of a storage device in communication with a host device.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

As used herein, the term "coupled" is used to indicate either a direct connection between two components or, where appropriate, an indirect connection to one another through intervening or intermediate components. In contrast, when a component referred to as being "directly coupled" to another component, there are no intervening elements present.

In the following detailed description, various aspects of a storage device in communication with a host device will be presented. These aspects are well suited for flash storage devices, such as SSDs and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

A fused operation includes multiple distinct operations which a controller of a storage device may effectively execute as a single operation (atomically, without an intervening operation between the two distinct operations). In other words, the storage device executes fused operation commands in sequence as an atomic unit (e.g., the storage device may behave as if no other operations are executed between the distinct operations). If an error is encountered in either command, the storage device ends the fused operation. Similarly, if the host sends an abort command for each fused operation command, the storage device may abort the fused operation.

One example of a fused operation is a compare and write, in which the storage device effectively combines a compare command and a write command received from a host device into a single command to be executed. In a compare and write, the host device sends the storage device a compare command including old host data and a logical address range, and a write command including new host data and the same logical address range. The storage device compares the old host data with stored data read from the indicated logical address range, and if the compare passes (e.g., the old host data is the same as the stored data), the storage device writes the new host data to the indicated logical address range in replacement of the stored data. In contrast, if the compare fails (e.g., the old host data is not the same as the stored data), the storage device does not process the subsequent write command.

The benefits of a fused operation such as a compare and write may be seen, for example, in the case of updating an existing file in the storage device with a new version of the file. For instance, the host device may instruct the storage device to compare an old version of the file with a stored version of the file to ensure the stored version is as expected, and then to overwrite the old version of the file with a new version of the file received from the host device. The fused or atomic nature of this operation may prevent undesired scenarios where two users attempt to modify an identical copy of a file at the same time, since the compare may pass for the first user in time and the associated data subsequently overwritten before the compare is executed for the second user in time. Since the overwrite by the first user would occur before the compare operation of the second user due to the atomic nature of compare and write operations, the compare of the second user will fail since the file versions are no longer the same, and thus the second user would be preventing from performing a conflicting write to that file.

A controller of the storage device picks up fused operation commands (e.g., the compare command and the write command in the case of a compare and write) for execution from a submission queue. Generally, the host device may communicate to the controller that a new command has been posted to the submission queue by writing an indication of the posting (e.g., a pointer to a descriptor for the command) to a register in the storage device. The controller may poll this register until the register write occurs, which occurrence effectively acts as a doorbell to the controller informing the controller that the command is in the submission queue. In the case of fused operations, the host may post the fused operation commands (e.g., the compare and write commands) in the submission queue, and then update the doorbell by writing a pointer to the descriptors for these commands in the register. The controller may then access the fused operation commands from the submission queue.

While some controllers may include hardware configured to pop multiple fused operation commands at a time from a submission queue, many controllers do not have such hardware due to its complexity and cost. Therefore, a controller typically pops fused operation commands one at a time from the submission queue. However, since there is no guarantee that fused operation commands are adjacent to each other in the submission queue; it is possible another unrelated command may be placed in the submission queue between the fused operation commands. For example, it is possible that a read command or another write command may be placed in the submission queue between the fused compare and write commands. Thus, if the commands were executed as ordered, the unrelated command would undesirably become an intervening command to the fused operation. Therefore, it would be helpful for the controller to ensure the atomicity of a fused operation in the case that the fused operation commands are not adjacent to each other in a submission queue. It would also be helpful for the controller to handle situations where proper command ordering for fused commands is not followed, such as cases where an unrelated command follows a fused operation command, where fused operation commands are in the wrong order (e.g., write followed by compare), or other cases which are otherwise invalid for fused operations (e.g., where a logical address range in a compare command overlaps with a logical address range of an unrelated command, or where a logical address range in a write command is not the same as the logical address range in a compare command).

Additionally, multiple submission queues may be maintained in a storage device. For instance, each submission queue may contain commands (including fused operation commands) for a respective memory die of the storage device. As a result, to balance the load in each memory die, the controller may arbitrate a processing order for commands across the memory dies or submission queues. For instance, the controller may pop one command for processing from a first submission queue (e.g., for a first memory die), then one command for processing from a second submission queue (e.g., for a second memory die), and so forth for each submission queue until the controller returns to the first submission queue, after which the controller may repeat the above process according to the processing order. However, if a command popped from one of these submission queues is a fused operation command, such arbitration may cause the controller to hold off on processing commands in other submission queues (unrelated to the fused operation) until the controller returns to the original submission queue to pop and process the other fused operation command. Thus, the controller may experience an undesirable delay or latency in performing the other commands. For instance, in the case of a compare and write, after picking a compare command from one submission queue, the controller may be delayed from processing commands in the other submission queues until after the controller returns to the original submission queue according to the arbitrated processing order, picks the write command from that submission queue, and performs the fused operation. Therefore, it would also be helpful for the controller to minimize such latency in performing other queued commands.

To these ends, the controller in the storage device of the present disclosure may configure a data structure such as a linked list, for each submission queue, in order to pair and atomically process fused operation commands. These data structures may also be referred to as pseudo submission queues. In one example, the controller may initialize an empty linked list, and as it pops commands from submission queues (e.g., according to an arbitrated processing order), the controller checks whether a currently popped command is a fused operation command. If the command is for a fused operation, the controller pushes the command to the corresponding pseudo submission queue or linked list and increments a count for that pseudo queue or linked list. Otherwise, the controller may process the command normally (e.g., read data if a read command, write data if a write command, etc.).

In this example, if a linked list has a count greater than 0 (e.g., the linked list already stores one fused operation command from a submission queue), the controller may validate each subsequent command in the corresponding submission queue against the pending fused operation command in the linked list. For example, the controller may check whether a next command in the submission queue indicates a same LBA range as that of the pending fused operation command in the linked list, and whether the next command follows an expected fused command order (e.g., a compare followed by a write to the same LBAs). If the LBA ranges are the same and the expected command order is met, the controller may pair and process the fused operation commands as well as remove the paired fused operation commands from the corresponding linked list. On the other hand, if the LBA ranges only partially overlap or if the expected command order is not met (e.g., the next command is not a write to the same LBAs), the controller may fail the fused operation since a violation of a fused pair has occurred. Alternatively, if the LBA ranges do not overlap even partially and if the expected command order is not met (e.g., the next command is not a write, or is a write to completely different LBAs), then no fused pair violation has occurred, so the controller may process the command in the submission queue normally (e.g., read data if a read command or write data if a write command). In the latter case, the controller may leave the pending fused operation command in the linked list and repeat the validation check for a following command in the submission queue (after returning to that queue according to an arbitrated processing order).

In another example, the controller may similarly pop one command at a time from different submission queues according to an arbitrated processing order and perform similar validation checks, but also perform error preventing operations. For example, the controller may serialize each command to prevent race conditions with other popped commands (e.g., using dedicated hardware which locks and unlocks certain LBA ranges for firmware processing) and prevent deadlocks in fused command processing. In particular, for each popped command, the controller may temporarily prevent other commands including the same LBA range from being processed, during which time the controller may check whether the command is a fused operation command (e.g., a compare or a write). If the command is a fused operation command which is the first command in the expected command order (e.g., the compare command), the controller checks whether the first command may cause a deadlock in fused command processing. For instance, if the controller supports a maximum number of fused commands N in total across its linked lists (e.g., a maximum number N pseudo submission queues), the controller may check if N−1 other first commands (e.g., other compare commands of respective fused operations) have already been stored in the various linked lists. If not, the controller may add the current first command as a pending fused operation command in the corresponding linked list. The controller may also set a bitmap indicating that corresponding linked list has a pending fused operation command, as well as release that command (e.g., unlock its LBA range, or in other words, stop preventing other commands including the same LBA range from being processed) to allow a next fused operation command with the same LBA range to be processed. Otherwise if N−1 other first commands have already been stored in the linked lists, the controller fails and removes the oldest fused operation command in the corresponding linked list before adding the current first command to that linked list. As a result, the controller may ensure that at most N−1 compare commands for different fused operations occupy its available memory for linked lists, so that the controller may still have enough memory to add at least one fused write command to a linked list for fused command processing. This action may avoid a deadlock in processing which may occur if all the available memory was filled with only compare commands (leaving no room left over for a write command).

In this example, if the current command popped from the submission queue is not a fused operation command (e.g., it is a normal input/output command), the controller may search the corresponding linked list to check whether a fused compare command indicating an overlapping LBA range has previously been stored in the linked list. If such command is found, then a fused pair violation has occurred, and the controller may report an error to the host for the pending fused command. Otherwise, no fused pair violation has occurred, and so the controller may process the current command normally (e.g., read data if a read command, write data if a write command, etc.). Similarly, if the current command popped from the submission queue is the second command in the expected command order (e.g., the write command), the controller may similarly search the corresponding linked list to check whether a fused compare command indicating an overlapping LBA range has previously been stored in the linked list. If such command is not found, then a fused pair violation has occurred, and the controller may report an error to the host that a paired fused compare command was not found. Otherwise, the controller pairs the fused operation commands, and removes the fused compare command from the linked list. The controller may also clear the bitmap indicating that corresponding linked list has a pending fused operation command, as well as release that command (e.g., unlock its LBA range) to allow a next command for the same LBA range to be processed. Finally, the controller may process the fused commands (e.g., perform a compare and write).

Thus, the controller of the storage device may configure and utilize data structures such as linked lists for handling fused commands in different submission queues according to an arbitrated submission queue processing order. As a result, controllers (without a specific fused command hardware engine capable of popping multiple fused commands at a time) may pop commands one at a time from different host submission queues and support fused command validation without impacting existing queue arbitration logic while also minimizing impact to the performance or latency of other parallel commands. Additionally, while each data structure is not limited to being a linked list, a linked list may be advantageous over other data structures (e.g., ring buffers) for pairing and atomically processing fused operation commands. For example, in response to popping a fused operation command from a given submission queue, the controller may time-efficiently locate and search a corresponding linked list for an existing fused operation command when performing validation, in contrast to ring buffers that store every fused operation command and thus may take significantly longer for the controller to search. Moreover, while the disclosure refers to compare and write in its examples of fused operations, a fused operation may not be limited to a compare and write and may encompass other atomically processed operations.

FIG. 1 shows an exemplary block diagram 100 of a storage device 102 which communicates with a host device 104 (also "host") according to an exemplary embodiment. The host 104 and the storage device 102 may form a system, such as a computer system (e.g., server, desktop, mobile/laptop, tablet, smartphone, etc.). The components of FIG. 1 may or may not be physically co-located. In this regard, the host 104 may be located remotely from storage device 102. Although FIG. 1 illustrates that the host 104 is shown separate from the storage device 102, the host 104 in other embodiments may be integrated into the storage device 102, in whole or in part. Alternatively, the host 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices. In other examples, the host memory 103 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host interface 106 is configured to interface the storage device 102 with the host 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the storage device 102 with the host 104 using, for example, cellular communication (e.g. 5G NR, 4G LTE, 3G, 2G, GSM/UMTS, CDMA One/CDMA2000, etc.), wireless distribution methods through access points (e.g. IEEE 802.11, WiFi, HiperLAN, etc.), Infra Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

The storage device 102 includes a memory. For example, in the exemplary embodiment of FIG. 1, the storage device 102 may include a non-volatile memory (NVM) 110 for persistent storage of data received from the host 104. The NVM 110 can include, for example, flash integrated circuits, NAND memory (e.g., single-level cell (SLC) memory, multi-level cell (MLC) memory, triple-level cell (TLC) memory, quad-level cell (QLC) memory, penta-level cell (PLC) memory, or any combination thereof), or NOR memory. The NVM 110 may include a plurality of memory locations 112 which may store system data for operating the storage device 102 or user data received from the host for storage in the storage device 102. For example, the NVM may have a cross-point architecture including a 2-D NAND array of memory locations 112 having n rows and m columns, where m and n are predefined according to the size of the NVM. In the exemplary embodiment of FIG. 1, each memory location 112 may be a die 114 including multiple planes each including multiple blocks of multiple cells 116. Alternatively, each memory location 112 may be a plane including multiple blocks of the cells 116. The cells 116 may be single-level cells, multi-level cells, triple-level cells, quad-level cells, and/or penta-level cells, for example. Other examples of memory locations 112 are possible; for instance, each memory location may be a block or group of blocks. Each memory location may include one or more blocks in a 3-D NAND array. Each memory location 112 may include one or more logical blocks which are mapped to one or more physical blocks. Alternatively, the memory and each memory location may be implemented in other ways known to those skilled in the art.

The storage device 102 also includes a volatile memory 118 that can, for example, include a Dynamic Random Access Memory (DRAM) or a Static Random Access Memory (SRAM). Data stored in volatile memory 118 can include data read from the NVM 110 or data to be written to the NVM 110. In this regard, the volatile memory 118 can include a write buffer or a read buffer for temporarily storing data. While FIG. 1 illustrates the volatile memory 118 as being remote from a controller 123 of the storage device 102, the volatile memory 118 may be integrated into the controller 123.

The memory (e.g. NVM 110) is configured to store data 119 received from the host device 104. The data 119 may be stored in the cells 116 of any of the memory locations 112. As an example, FIG. 1 illustrates data 119 being stored in different memory locations 112, although the data may be stored in the same memory location. In another example, the memory locations 112 may be different dies, and the data may be stored in one or more of the different dies.

Each of the data 119 may be associated with a logical address. For example, the NVM 110 may store a logical-to-physical (L2P) mapping table 120 for the storage device 102 associating each data 119 with a logical address. The L2P mapping table 120 stores the mapping of logical addresses specified for data written from the host 104 to physical addresses in the NVM 110 indicating the location(s) where each of the data is stored. This mapping may be performed by the controller 123 of the storage device. The L2P mapping table may be a table or other data structure which includes an identifier such as a logical block address (LBA) associated with each memory location 112 in the NVM where data is stored. While FIG. 1 illustrates a single L2P mapping table 120 stored in one of the memory locations 112 of NVM to avoid unduly obscuring the concepts of FIG. 1, the L2P mapping table 120 in fact may include multiple tables stored in one or more memory locations of NVM.

Figure 2:
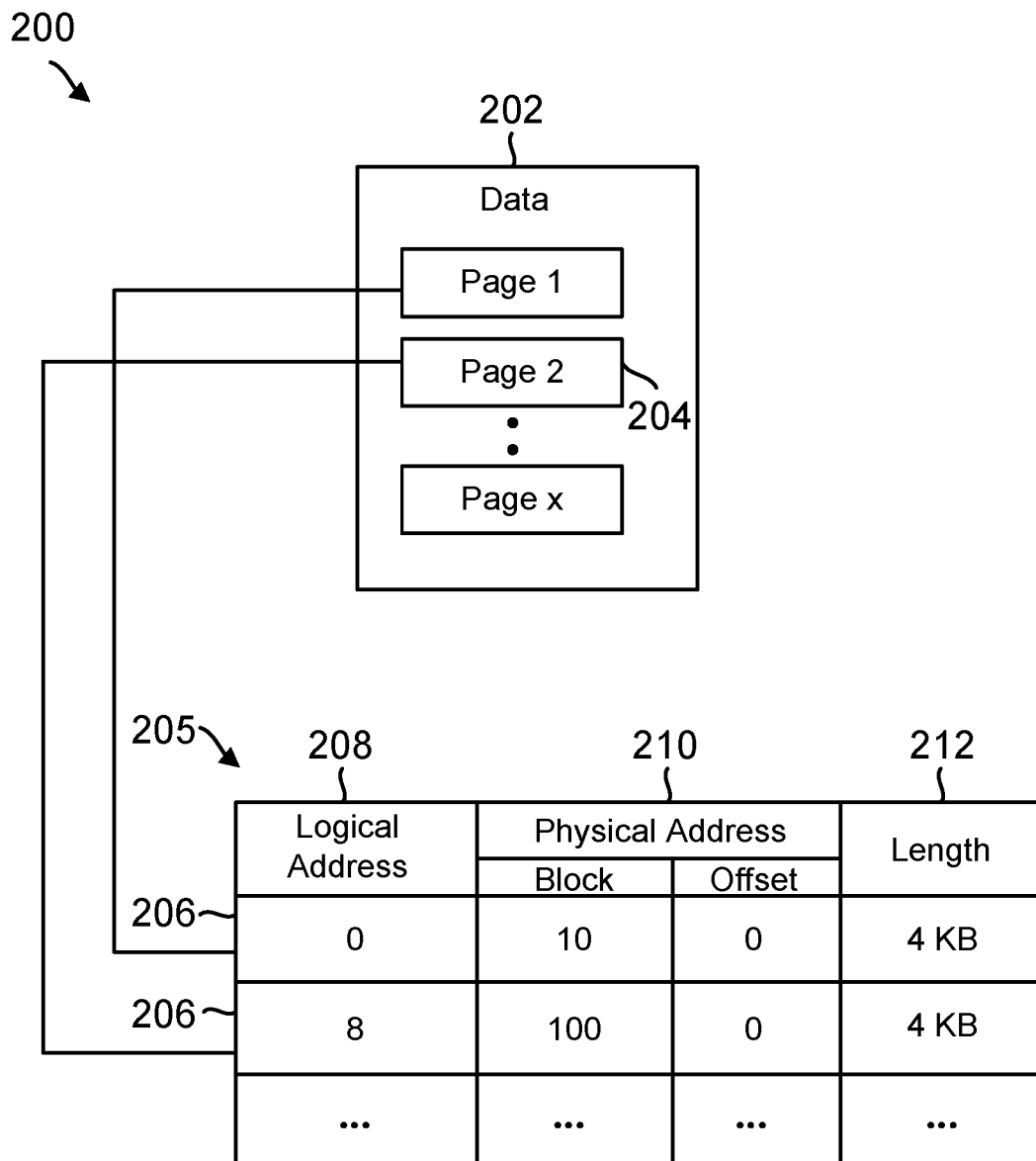
FIG. 2 is a conceptual diagram illustrating an example of a logical-to-physical mapping table in a non-volatile memory of the storage device of FIG. 1.

FIG. 2 is a conceptual diagram 200 of an example of an L2P mapping table 205 illustrating the mapping of data 202 received from a host device to logical addresses and physical addresses in the NVM 110 of FIG. 1. The data 202 may correspond to the data 119 in FIG. 1, while the L2P mapping table 205 may correspond to the L2P mapping table 120 in FIG. 1. In one exemplary embodiment, the data 202 may be stored in one or more pages 204, e.g., pages 1 to x, where x is the total number of pages of data being written to the NVM 110. Each page 204 may be associated with one or more entries 206 of the L2P mapping table 205 identifying a logical block address (LBA) 208, a physical address 210 associated with the data written to the NVM, and a length 212 of the data. LBA 208 may be a logical address specified in a write command for the data received from the host device. Physical address 210 may indicate the block and the offset at which the data associated with LBA 208 is physically written. Length 212 may indicate a size of the written data (e.g. 4 KB or some other size).

Referring back to FIG. 1, the volatile memory 118 also stores a cache 122 for the storage device 102. The cache 122 includes entries showing the mapping of logical addresses specified for data requested by the host 104 to physical addresses in NVM 110 indicating the location(s) where the data is stored. This mapping may be performed by the controller 123. When the controller 123 receives a read command or a write command for data 119, the controller checks the cache 122 for the logical-to-physical mapping of each data. If a mapping is not present (e.g. it is the first request for the data), the controller accesses the L2P mapping table 120 and stores the mapping in the cache 122. When the controller 123 executes the read command or write command, the controller accesses the mapping from the cache and reads the data from or writes the data to the NVM 110 at the specified physical address. The cache may be stored in the form of a table or other data structure which includes a logical address associated with each memory location 112 in NVM where data is being read.

The NVM 110 includes sense amplifiers 124 and data latches 126 connected to each memory location 112. For example, the memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the memory location 112, the sense amplifiers 124 sense the data by amplifying the voltages on the bit lines to a logic level (e.g. readable as a '0' or a '1'), and the sensed data is stored in the data latches 126. The data is then transferred from the data latches 126 to the controller 123, after which the data is stored in the volatile memory 118 until it is transferred to the host device 104. When data is written to the cells 116 of the memory location 112, the controller 123 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof.

The controller 123 is configured to receive data transferred from one or more of the cells 116 of the various memory locations 112 in response to a read command. For example, the controller 123 may read the data 119 by activating the sense amplifiers 124 to sense the data from cells 116 into data latches 126, and the controller 123 may receive the data from the data latches 126. The controller 123 is also configured to program data into one or more of the cells 116 in response to a write command. For example, the controller 123 may write the data 119 by sending data to the data latches 126 to be programmed into the cells 116. The controller 123 is further configured to access the L2P mapping table 120 in the NVM 110 when reading or writing data to the cells 116. For example, the controller 123 may receive logical-to-physical address mappings from the NVM 110 in response to read or write commands from the host device 104, identify the physical addresses mapped to the logical addresses identified in the commands (e.g. translate the logical addresses into physical addresses), and access or store data in the cells 116 located at the mapped physical addresses.

The controller 123 and its components may be implemented with embedded software that performs the various functions of the controller described throughout this disclosure. Alternatively, software for implementing each of the aforementioned functions and components may be stored in the NVM 110 or in a memory external to the storage device 102 or host device 104, and may be accessed by the controller 123 for execution by the one or more processors of the controller 123. Alternatively, the functions and components of the controller may be implemented with hardware in the controller 123, or may be implemented using a combination of the aforementioned hardware and software.

In operation, the host device 104 stores data in the storage device 102 by sending a write command to the storage device 102 specifying one or more logical addresses (e.g., LBAs) as well as a length of the data to be written. The interface element 106 receives the write command, and the controller allocates a memory location 112 in the NVM 110 of storage device 102 for storing the data. The controller 123 stores the L2P mapping in the NVM (and the cache 122) to map a logical address associated with the data to the physical address of the memory location 112 allocated for the data. The controller also stores the length of the L2P mapped data. The controller 123 then stores the data in the memory location 112 by sending it to one or more data latches 126 connected to the allocated memory location, from which the data is programmed to the cells 116.

The host 104 may retrieve data from the storage device 102 by sending a read command specifying one or more logical addresses associated with the data to be retrieved from the storage device 102, as well as a length of the data to be read. The interface 106 receives the read command, and the controller 123 accesses the L2P mapping in the cache 122 or otherwise the NVM to translate the logical addresses specified in the read command to the physical addresses indicating the location of the data. The controller 123 then reads the requested data from the memory location 112 specified by the physical addresses by sensing the data using the sense amplifiers 124 and storing them in data latches 126 until the read data is returned to the host 104 via the host interface 106.

Figure 3:
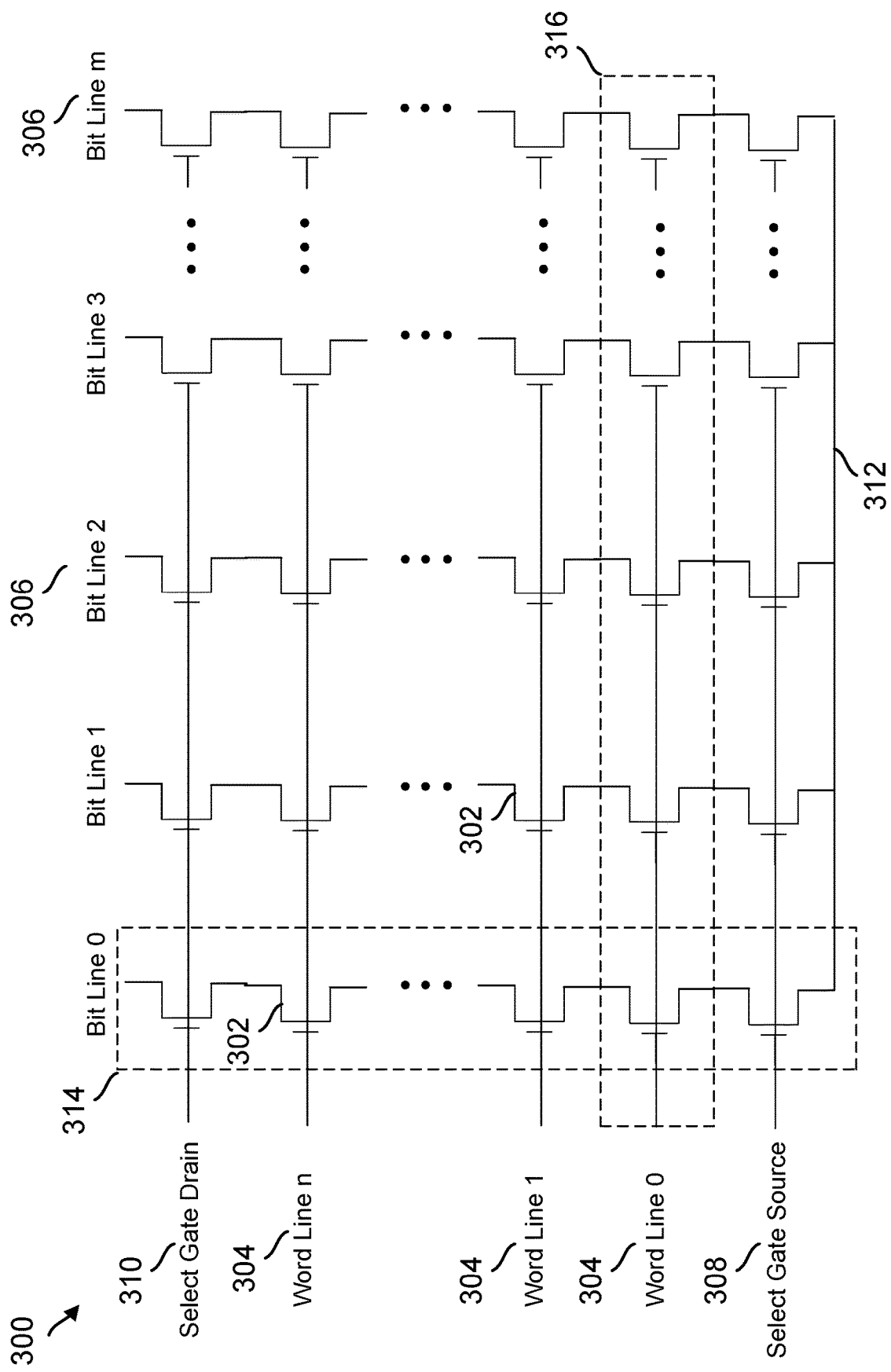
FIG. 3 is a conceptual diagram illustrating an example of an array of memory cells in the storage device of FIG. 1.

FIG. 3 illustrates an example of a NAND memory array 300 of cells 302. Cells 302 may correspond to cells 116 in the NVM 110 of FIG. 1. Multiple cells 302 are coupled to word lines 304 and bit lines 306. For example, the memory array 300 may include n word lines and m bit lines within a block of a die 114 of the NVM 110, where n and m are predefined according to the size of the block. Each word line and bit line may be respectively associated with a row and column address, which the controller 123 may use to select particular word lines and bit lines (e.g. using a row and column decoder). For example, word lines 0-$n$ may each be associated with their own row address (e.g. word line 0 may correspond to word line address 0, word line 1 may correspond to word line address 1, etc.), and bit lines 0-$m$ may each be associated with their own column address (e.g. bit line 0 may correspond to bit line address 0, bit line 1 may correspond to bit line address 1, etc.). Select gate source (SGS) cells 308 and select gate drain (SGD) cells 310 are coupled to the memory cells 302 on each bit line 306. The SGS cells 308 and SGD cells 310 connect the memory cells 302 to a source line 312 (e.g. ground) and bit lines 306, respectively. A string 314 may include a group of cells 302 (including SGS and SGD cells 308, 310) coupled to one bit line within a block, while a page 316 may include a group of cells 302 coupled to one word line within the block.

Figure 4:
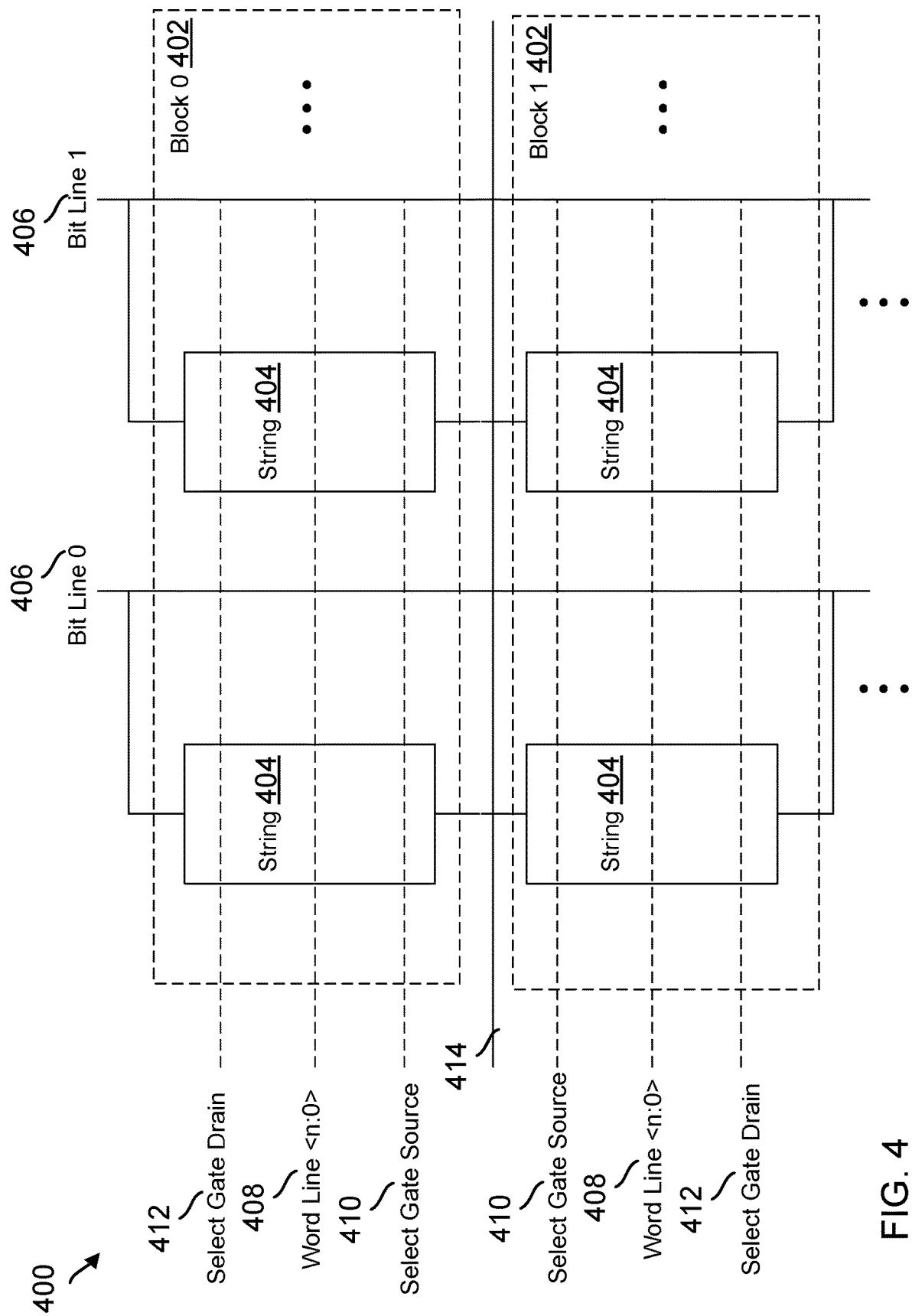
FIG. 4 is a conceptual diagram illustrating an example of an array of blocks in the storage device of FIG. 1.

FIG. 4 illustrates an example of a NAND memory array 400 of blocks 402 including multiple strings 404. Blocks 402 may correspond to blocks of a die 114 in the NVM 110 of FIG. 1, and strings 404 may each correspond to string 314 in FIG. 3. As in the memory array 300 of FIG. 3, each string 404 may include a group of memory cells each coupled to a bit line 406 and individually coupled to respective word lines 408. Similarly, each string may include a SGS cell 410 and SGD cell 412 which respectively connects the memory cells in each string 404 to a source line 414 and bit line 406.

When the controller 123 reads data from or writes data to a page 316 of cells 302 (i.e. on a word line 304, 408), the controller may send a command to apply a read voltage or program voltage to the selected word line and a pass through voltage to the other word lines. The read or programmed state of the cell (e.g. a logic '0' or a logic '1' for SLCs) may then be determined based on a threshold voltage of the cells 302. For example, during an SLC read operation, if the threshold voltage of a cell 302 is smaller than the read voltage (i.e. current flows through the cell in response to the read voltage), the controller 123 may determine that the cell stores a logic '1', while if the threshold voltage of the cell 302 is larger than the read voltage (i.e. current does not flow through the cell in response the read voltage), the controller 123 may determine that the cell stores a logic '0'. Similarly, during an SLC program operation, the controller may store a logic '0' by sending a command to apply the program voltage to the cell 302 on the word line 304, 408 until the cell reaches the threshold voltage, and during an erase operation, the controller may send a command to apply an erase voltage to the block 402 including the cells 302 (e.g. to a substrate of the cells such as a p-well) until the cells reduce back below the threshold voltage (back to logic '1').

For cells that store multiple bits (e.g. MLCs, TLCs, etc.), each word line 304, 408 may include multiple pages 316 of cells 302, and the controller may similarly send commands to apply read or program voltages to the word lines to determine the read or programmed state of the cells based on a threshold voltage of the cells. For instance, in the case of TLCs, each word line 304, 408 may include three pages 316, including a lower page (LP), a middle page (MP), and an upper page (UP), respectively corresponding to the different bits stored in the TLC. In one example, when programming TLCs, the LP may be programmed first, followed by the MP and then the UP. For example, a program voltage may be applied to the cell on the word line 304, 408 until the cell reaches a first intermediate threshold voltage corresponding to a least significant bit (LSB) of the cell. Next, the LP may be read to determine the first intermediate threshold voltage, and then a program voltage may be applied to the cell on the word line until the cell reaches a second intermediate threshold voltage corresponding to a next bit of the cell (between the LSB and the most significant bit (MSB)). Finally, the MP may be read to determine the second intermediate threshold voltage, and then a program voltage may be applied to the cell on the word line until the cell reaches the final threshold voltage corresponding to the MSB of the cell. Alternatively, in other examples, the LP, MP, and UP may be programmed together (e.g., in full sequence programming or Foggy-Fine programming), or the LP and MP may be programmed first, followed by the UP (e.g., LM-Foggy-Fine programming). Similarly, when reading TLCs, the controller 123 may read the LP to determine whether the LSB stores a logic 0 or 1 depending on the threshold voltage of the cell, the MP to determine whether the next bit stores a logic 0 or 1 depending on the threshold voltage of the cell, and the UP to determine whether the final bit stores a logic 0 or 1 depending on the threshold voltage of the cell.

Figure 5:
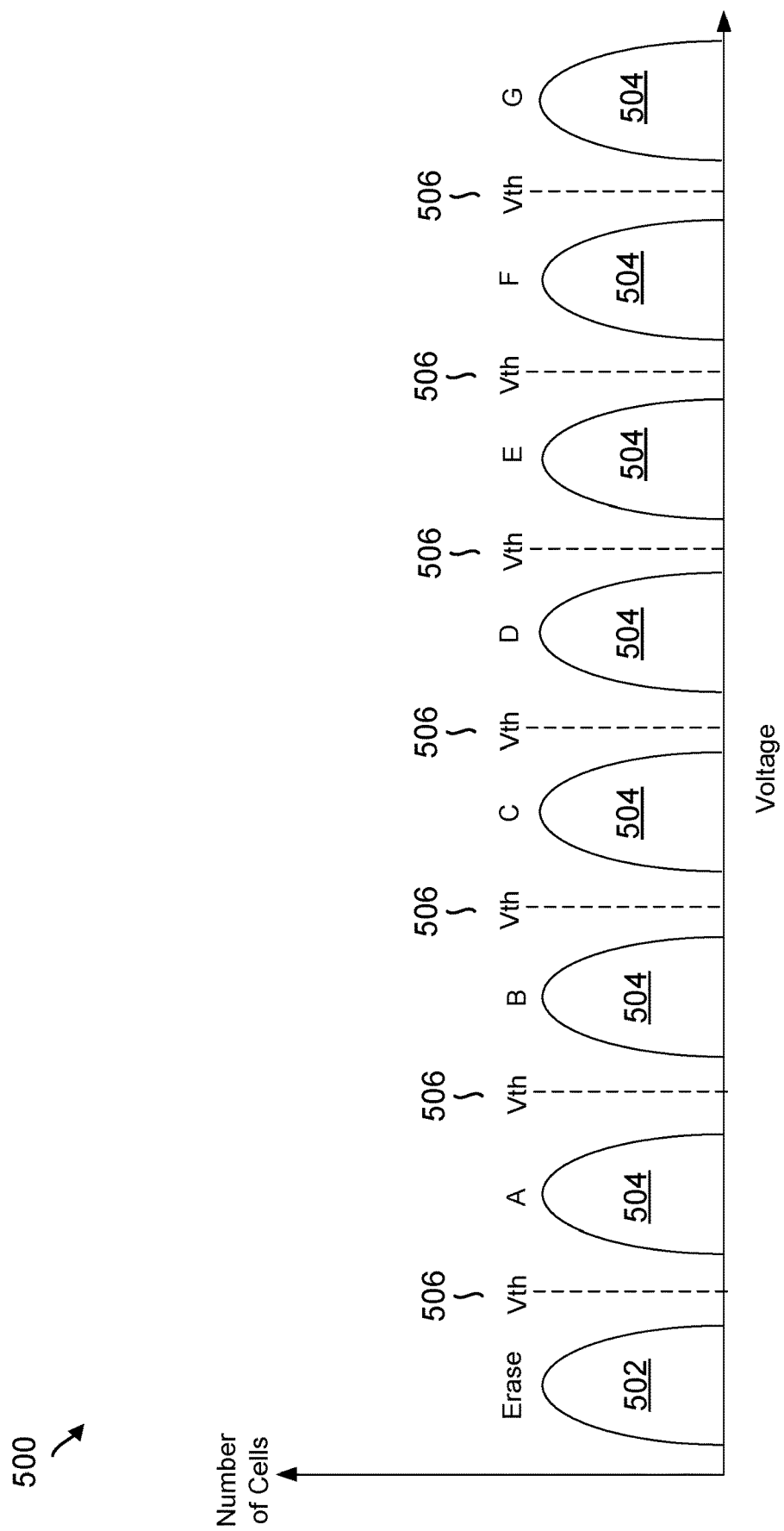
FIG. 5 is a graphical diagram illustrating an example of a voltage distribution chart for triple-level cells in the storage device of FIG. 1.

FIG. 5 illustrates an example of a voltage distribution chart 500 illustrating different NAND states for TLCs (e.g. cells 116, 302) storing three bits of data (e.g. logic 000, 001, etc. up to logic 111). The TLCs may include an erase state 502 corresponding to logic '111' and multiple program states 504 (e.g. A-G) corresponding to other logic values '000-110'. The program states 504 may be separated by different threshold voltages 506. Initially, the cells 116, 302 may be in the erase state 502, e.g. after the controller 123 erases a block 402 including the cells. When the controller 123 program LPs, MPs, and UPs as described above, the voltages of the cells 116, 302 may be increased until the threshold voltages 506 corresponding to the logic values to be stored are met, at which point the cells transition to their respective program states 504. While FIG. 5 illustrates eight NAND states for TLCs, the number of states may be different depending on the amount of data that is stored in each cell 116, 302. For example, SLCs may have two states (e.g. logic 0 and logic 1), MLCs may have four states (e.g. logic 00, 01, 10, 11), and QLCs may have sixteen states (e.g. erase and A-N).

Figure 6:
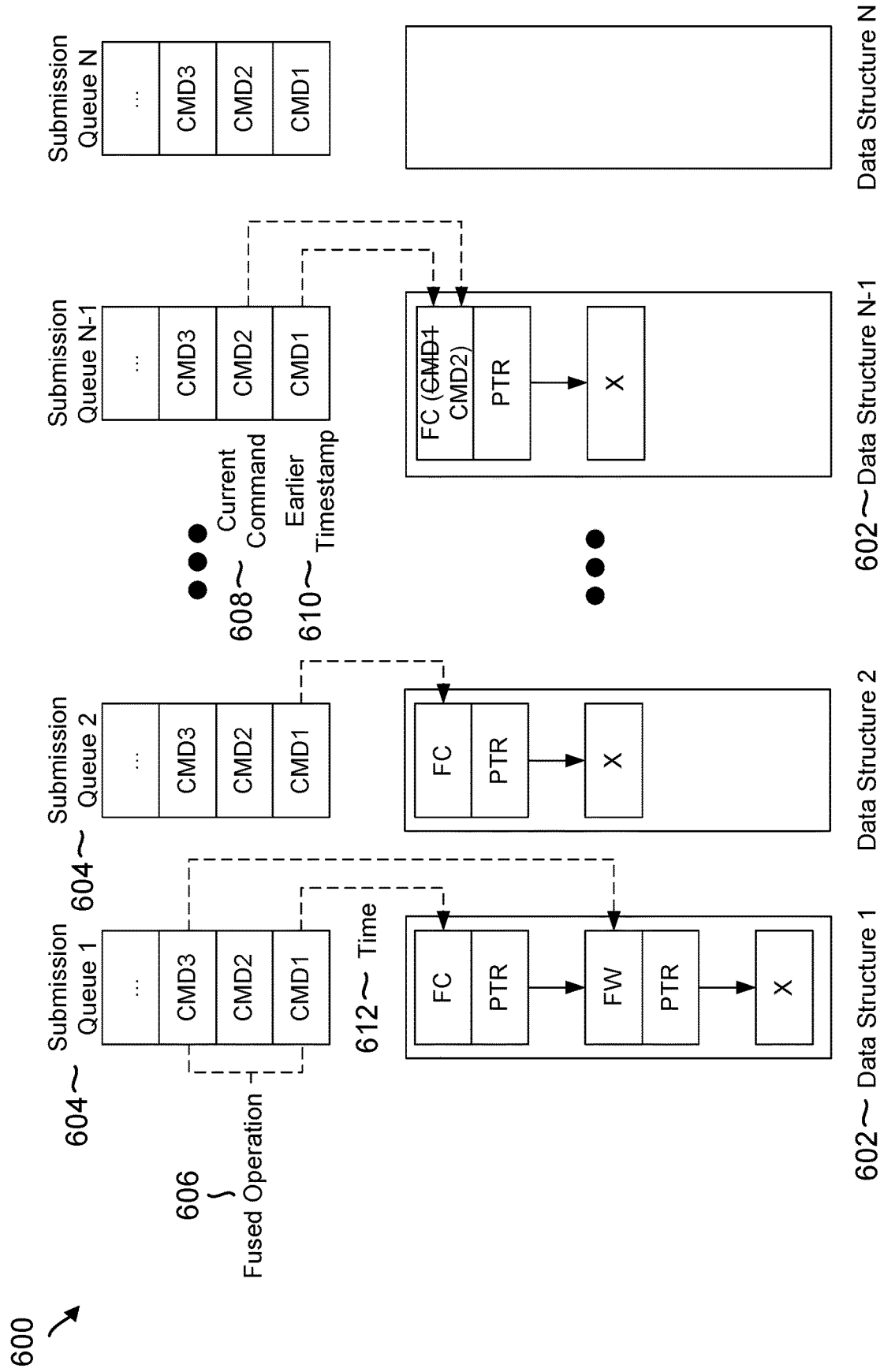
FIG. 6 is a conceptual diagram illustrating an example of data structures of a storage device associated respectively with different submission queues.

FIG. 6 illustrates an example 600 of data structures 602 (e.g., pseudo submission queues or linked lists) of the storage device associated respectively with different submission queues 604. Each of the submission queues 604 may include various commands (e.g., CMD1, CMD2, CMD3, etc.) for different memory dies. For example, N submission queues may be provided each containing commands for a given memory die of the storage device. At least one of the submission queues may also include commands for a fused operation 606 (e.g., a compare and write). For instance, in the example of FIG. 6, submission queue 1 may include a compare command as CMD1 and a write command as CMD3 for a given compare and write, separated by an unrelated command CMD2.

The submission queues 604 may be configured in hardware at an intersection between the storage device and the host device for storing any host command. In contrast, the data structures 602 may be configured in the firmware of the storage device specifically for fused operation commands. For example, the submission queues may be, for example, buffers, shift registers, or other hardware-implemented queues which may store host commands received from the host device, while the data structures may be linked lists or other firmware-implemented data structures in volatile memory which may store fused operation commands popped from the submission queues. A one-to-one mapping may exist between each of the data structures and the submission queues (e.g., one data structure may be associated with each submission queue). Thus, in the example of FIG. 6, the controller may maintain N data structures, one for each of N submission queues, which may store fused operation commands popped from the respective submission queues. As an example, data structure 1 may store compare command CMD1 (a fused compare or "FC") and write command CMD3 (a fused write or "FW") for fused operation 606 in a linked list, including a pointer ("PTR") from the FC to the FW and another PTR from the FW to a terminator ("X") signifying the end of the linked list.

The controller may pop a command from one of the submission queues 604 and check whether the command is a fused operation command (e.g., a FC or FW). If so, the controller may place that fused operation command into the data structure 602 associated with that submission queue. For example, the popped command may include metadata indicating whether the command is fused or not with another command, and if the controller determines from the metadata that the popped command is for a fused operation, the controller may place this command in the data structure. During submission queue arbitration, the controller may pop commands from other submission queues and similarly check whether any of these commands are fused operation commands, in which case the controller may place the fused operation commands similarly into respectively associated data structures. For instance, in the example of FIG. 6, after confirming that CMD1 in submission queue 1 is a FC and placing it into data structure 1, the controller may similarly confirm that CMD1 in submission queue 2 is a different FC and place it into data structure 2. The controller may act similarly for each submission queue.

Once the controller returns to the initial submission queue during this arbitration, the controller may pop the next command from the submission queue and check whether the next command pairs with the existing command in the associated data structure. For example, the controller may check the metadata of the next command to determine whether the commands are part of the same fused operation, and whether the indicated starting LBA and length are the same (the LBA ranges completely overlap). If this validation is successful, the controller may store the next command in the associated data structure and execute the pair of fused operation commands. Otherwise, if the validation failed (e.g., the next command is for a different fused operation or not a fused operation command), the controller may fail the pending fused operation command and abort the fused operation, or in some cases perform some other task such as processing the next command. For instance, in the example of FIG. 6, the controller may confirm that CMD2 in submission queue 1 is an unrelated command that does not have an overlapping LBA range with CMD1 (e.g., CMD2 may be a read or write to a different LBA range), and therefore the controller may process CMD2 normally. Afterwards, the controller may confirm that CMD3 in submission queue 1 is a FW linked to CMD1 with an identical LBA range, and therefore place the FW into data structure 1. The controller may later pop the fused operation commands (FC and FW) from the pseudo submission queue that is data structure 1, and process the fused operation 606 accordingly.

Figure 7:
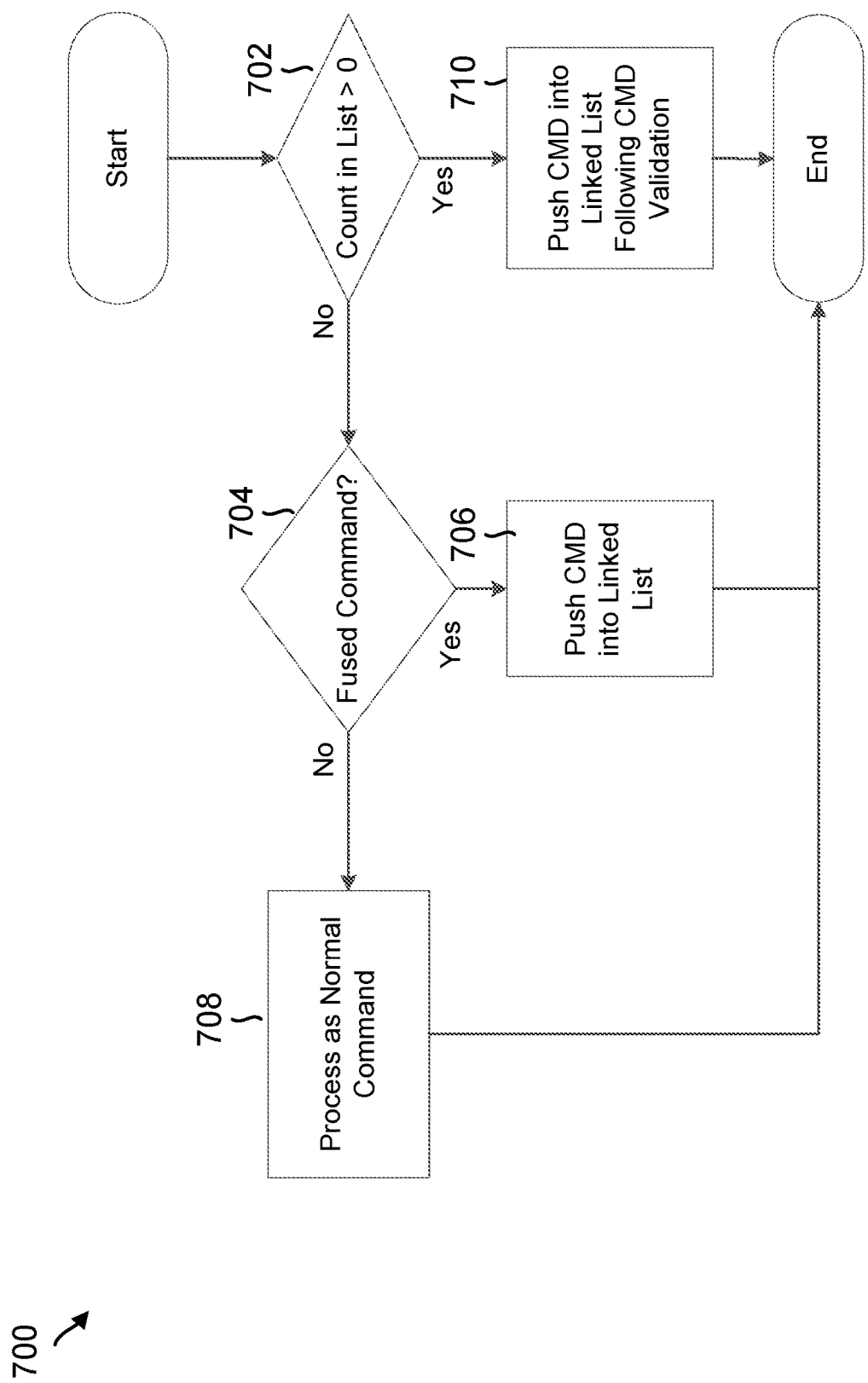
FIG. 7 is a flow chart illustrating an example of fused command handling.

FIG. 7 depicts a flow chart illustrating an example 700 of fused command handling. Initially, each data structure may be initialized with a fused operation command count ("count")=0, indicating the data structure is empty. After popping a command from a submission queue, at 702, the controller may check whether the count of the corresponding data structure=0. If count=0, then at 704, the controller may check whether the command is a fused command (e.g., a FC). If so, then at 706, the controller may place the FC in the data structure and increment the count for that data structure to count=1. Otherwise, if the command is not a fused command (e.g., an unrelated command), then at 708, the controller may process the unrelated command normally. The controller may repeat the aforementioned steps for each submission queue according to an arbitrated order.

Next, after popping a next command from the same submission queue (e.g., following a return to that submission queue in the arbitration), at 702, the controller may check the count of the corresponding data structure. Since the data structure already has the FC, count=1. Therefore, at 710, the controller may push the next command into the data structure to check whether the command is a valid command linked to the fused operation (e.g., a FW following the FC). The controller may validate the next command, for example, by checking the metadata of the command to identify whether the next command is a FW, and whether the starting LBA and length indicated in both commands are the same. If the validation passes (the next command is a FW with an identical LBA range as the FC), the controller may place the next command in the data structure as a paired command with the FC and process the fused operation.

Otherwise, if the validation fails at 710, the controller may either wait with processing the fused operation command (e.g., the FC) or abort the fused operation command depending on the next command. For example, if the FC in the data structure is for LBAs 10-15 but the next command from the submission queue is a read command for a different LBA range not overlapping with any of LBAs 10-15, the controller may process the read command and maintain the FC in the linked list pending another subsequent command validation. But if the next command overlaps with any of the LBAs for the FC (e.g., if the read command includes LBAs that start, end, or completely fall within LBAs 10-15), a validation failure will result and the controller may abort the FC and remove the command from the data structure due to a fused pair violation.

To make the validation process most time-efficient, the controller may maintain only a single pair of fused operation commands in a given data structure associated with a corresponding submission queue. Thus, if there are multiple submission queues such as illustrated in the example of FIG. 6, the controller may at worst-case maintain a single pair of fused operations in each data structure associated with a respective submission queue. The controller may maintain a same number of data structures as the number of submission queues, with a one-to-one mapping between each data structure and a corresponding submission queue. As a result of this limitation on the number of pairs in each data structure and the one-to-one mapping of data structures to submission queues, the controller may quickly validate a next command popped from a submission queue against the various, previously stored, fused operation commands. For instance, in the example of FIG. 6, when the controller checks whether CMD3 in submission queue 1 is a valid command to be paired with a corresponding FC, the controller may more rapidly check only the corresponding data structure (data structure 1) for the FC to determine whether the LBA ranges overlap, rather than more slowly checking for FCs in all of the N data structures.

Figure 8:
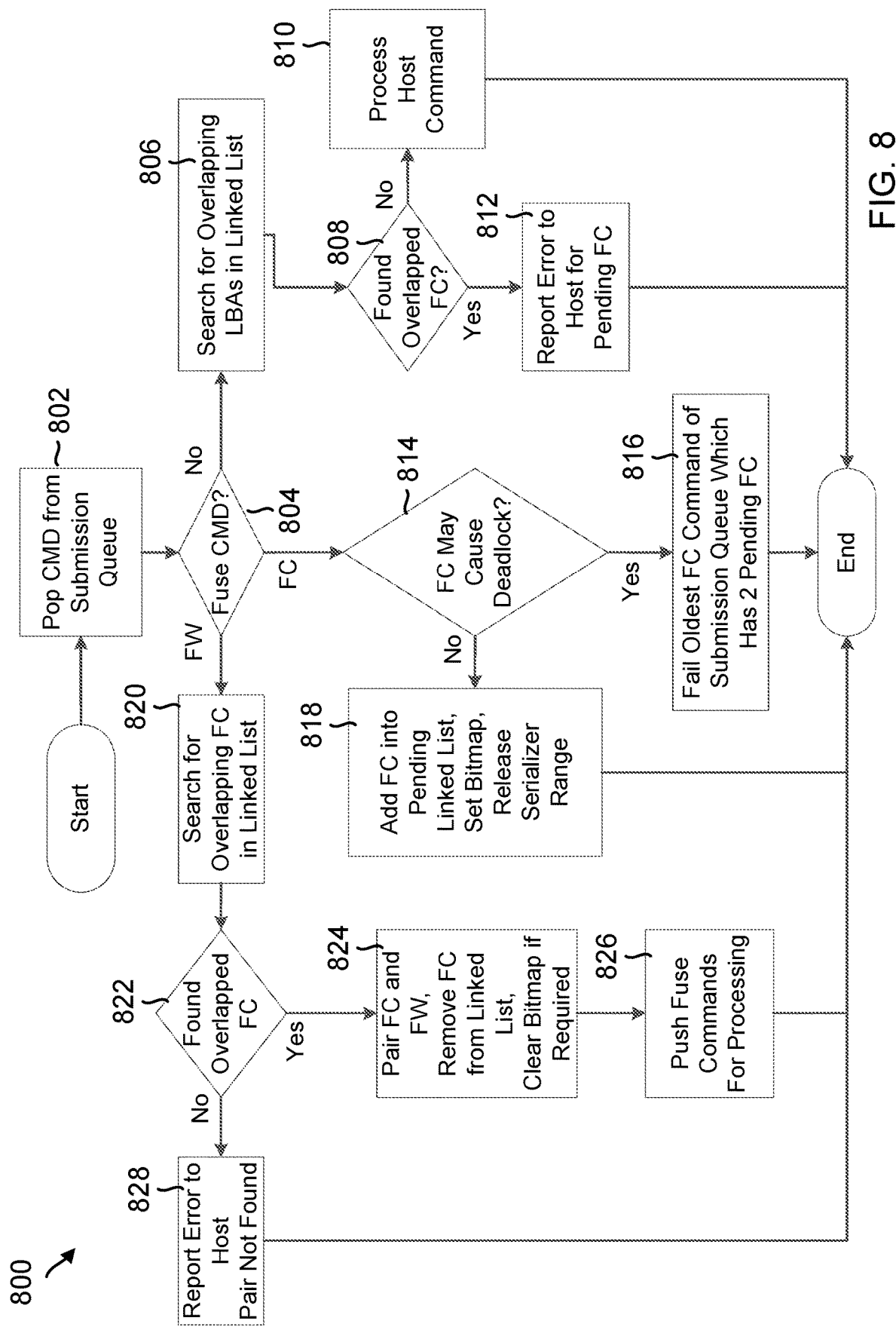
FIG. 8 is a flow chart illustrating another example of fused command handling.

FIG. 8 depicts a flow chart illustrating another example 800 of fused command handling. This example expands upon the example 700 of FIG. 7 to include more details on command validation and error reporting. Initially, at 802, the controller pops a command from a submission queue (e.g., in response to an indication or register write from the host device serving as a doorbell to the controller that a new command has been placed in the submission queue). Then at 804, the controller determines whether the popped (current) command is a fused operation command. For example, the controller may check the metadata of the command to identify whether the command is a FC, is a FW, or is not a fused operation command (e.g., a read or unrelated write). The flowchart branches in different directions depending on the current command.

If the controller determines at 804 that the current command is not a fused operation command, then the flowchart branches to the right path. In such case, at 806, the controller searches the data structure (e.g., the pseudo submission queue or linked list) associated with the submission queue to check whether the current command indicates a logical address range overlapping with that of a pending fused operation command (e.g., a FC) previously stored in the data structure. Then, at 808, depending on whether the controller finds a pending fused operation command with an overlapping LBA range or not, the controller may either process the current command at 810, or report an error to the host for the pending fused operation command at 812, respectively. For example, if the linked list stores a FC for LBAs 10-15, and the current command is a read command or unrelated write command which indicates LBAs that do not overlap with any of LBAs 10-15 (not even partially), then the controller may execute the read command or unrelated write command. However, if the current command alternatively indicated LBAs that overlapped even partially with any of LBAs 10-15, then the controller may report an error to the host device for the FC and abort the fused operation due to a violation of the atomicity of a fused operation command pairing. In this way, the controller may ensure the atomicity of paired fused operation commands (e.g., a FC and a FW with overlapping LBAs) by preventing a fused operation from occurring if an intervening unrelated command affects any of the LBAs associated with the fused operation. For example, the controller may refrain from performing a FC and FW on LBAs 10-15 if an unrelated read or write command affecting any of LBAs 10-15 happens to intervene in the submission queue, thereby preventing errors in the fused operation which could result from the unrelated read or write.

If the controller determines at 804 that the current command is a fused operation command which is expected to occur first in time for the fused operation (e.g., a FC), then the flowchart branches to the center path. In such case, at 814, the controller determines whether the current command may cause a deadlock in fused operations. For instance, the controller may check whether a maximum, pending number of FCs that the controller may support has already been stored in data structures (e.g., pseudo submission queues or linked lists) associated with various submission queues. As an example, assume that the controller has allocated space in volatile memory (e.g., volatile memory 118 of FIG. 1) to store at maximum N=256 fused operation commands in respective data structures, but N−1=255 FCs have already been popped from various submission queues and stored in respective data structures. In such case, then if the $N^{th}$ FC (the $256^{th}$ FC in this example) is stored in its corresponding data structure similar to the other FCs, there would not be available memory remaining in any of the data structures to later store a FW linked to a FC and subsequently execute the compare and write, thereby causing a deadlock in fused operations. Accordingly, to prevent such deadlock from occurring, the controller may report to the host device that the controller may store one less data structure (e.g., pseudo submission queue or linked list) or fused operation command than the controller actually supports. For example, in response to receiving an identity command or capability inquiry from the host device requesting the controller to expose or indicate to the host device its supported functionality, the controller may report to the host device that the controller only supports up to N−1 FCs (e.g., 255 FCs in this example) rather than the full NFCs (e.g., 256 FCs in this example) the controller actually supports in its volatile memory. As a result, even if the host device issues 255 FCs in its various submission queues for respective data structures, the controller may still have one space remaining to store a subsequent FW in its respective data structure.

Therefore, still referring to 814, since the controller has reported to the host device that it supports one less FC or data structure than its maximum capability (e.g., N−1 rather than N), the controller may expect to receive only N−1 unique FCs from respective submission queues. As a result, if the controller determines that the current command is an $N^{th}$ FC which could cause a deadlock as previously described, the controller may ascertain that this FC overlaps with (e.g., replaces) one of the previous N−1 FCs already popped from a respective submission queue and stored in a corresponding data structure. Accordingly, to store the FC in its respective data structure without causing a deadlock, at 816, the controller may replace the oldest FC in the data structure with the current FC. For example, the controller may check which of the two fused operation commands for that respective submission queue or data structure is the oldest FC (e.g., based on a timestamp of the previously stored FC and the current FC), fail the oldest FC, and abort the fused operation associated with the oldest FC.

For instance, referring to FIG. 6, assume in one example that the controller has popped a FC (CMD1) from submission queue 1 and placed that FC in data structure 1, then a FC (CMD1) from submission queue 2 in data structure 2, and so forth until and including a FC (CMD1) from submission queue N−1 in data structure N−1 according to the arbitrated processing order. Assume also in this example that CMD2 in each of submission queues 1 to N−2 are not for fused operations (and thus processed normally as previously described). As result, when the controller again returns to submission queue N−1, the controller may determine that current command 608 (CMD2) is another FC which overlaps with (e.g., indicates the same LBAs as) the previously stored FC (CMD1). Here, since N−1 FCs have already been stored in data structures, the controller may determine that current command 608 (the $N^{th}$ FC) would cause a deadlock if stored in its corresponding data structure. As a result, the controller replaces the previously stored FC (CMD1) in data structure N−1 with the current FC (CMD2) as illustrated, since CMD1 has an earlier timestamp 610 than CMD2. In this way, a deadlock is avoided so that when the controller returns again to submission queue 1 and pops the FW that is CMD3, the controller has memory space remaining to store and link the FW (the $N^{th}$ command) with the FC in data structure 1, thereby pairing the FC with the FW. The controller may subsequently perform fused operation 606 and empty the data structure 1.

Referring back to FIG. 8, on the other hand, most of the time the controller may determine at 814 that the current command will not cause a deadlock since the maximum number of supported fused operation commands has not yet been reached. In such case, at 818, the controller may add the current command (e.g., the FC) as a pending fused operation command to its corresponding data structure. The controller may also set a bitmap indicating that the corresponding data structure stores a FC (e.g., to facilitate searching of FCs in data structures later on during command validation). The controller may keep track of the current number of stored fused operation commands using a counter which the controller may increment each time a FC is stored in any of the data structures, and the controller may determine using this counter whether the current command may cause a deadlock or not at 814.

The controller may also include a serializer (e.g., a hardware engine, circuit, module, or other component of the storage device) which is configured to prevent the controller from processing overlapping commands out of an expected order due to race conditions (e.g., similar to a lock for an indicated LBA range). For instance, after the controller pops a command indicating an LBA range at 802 but before the controller determines the nature of the command at 804, the controller may configure the serializer to temporarily prevent other commands with the same LBA range from being received into the firmware for processing under the flow chart logic of FIG. 8. While this lock is set, the controller may proceed to perform the steps of FIG. 8 beginning with 804, including adding that command to the corresponding data structure at 818 if the command is a FC. After the command is added to the data structure, the controller may instruct the serializer to unlock or release the indicated LBA range (also at 818) to allow other commands indicating the same LBA range (e.g., a FW) to be processed under the logic of FIG. 8.

This serialization, which occurs from a time that the command is popped from the submission queue to the time that the command is placed in a corresponding data structure, allows the controller to maintain the atomicity of fused operations. For instance, by locking the LBA range indicated in each popped command (e.g., preventing other commands with the same LBA range from being received in the firmware during the lock), the controller may ensure that a race condition does not arise between two commands associated with the same LBA range. For instance, referring to the example of FIG. 6, during a time 612 that CMD1 (FC) is popped from submission queue 1 and placed in data structure 1, the controller may prevent a race condition with CMD2 (an unrelated command) or CMD3 (FW) indicating the same LBA range. In other words, the controller may serialize the commands to prevent the unexpected occurrence of an out-of-order situation where CMD2 or CMD3 is popped from submission queue 1 after CMD1, but is placed in data structure 1 before CMD1. Thus, the controller may ensure the first command for a fused operation (e.g., the FC) is processed first in time before the second command for that fused operation (e.g., the FW), as well as ensure that an unrelated data read or write to the same LBA ranges is not processed in an unexpected order with respect to the fused operation, thereby avoiding unexpected fused operation errors or data ambiguity.

Now, if the controller determines at 804 that the current command is a fused operation command which is expected to occur second in time for the fused operation (e.g., a FW), then the flowchart branches to the left path. In such case, a different fused operation command expected to occur first in time for the fused operation (e.g., a linked FC) has previously been stored in a corresponding data structure, so at 820, the controller may search for this overlapping fused operation command in the corresponding data structure. For instance, the controller may check the metadata of the stored FC in the corresponding data structure and compare this metadata with the metadata of the current FW to identify whether a valid pair exists (e.g., the LBA ranges of both commands are the same). If the controller determines that validation is successful at 822 (that an FC with overlapping LBA ranges was found), then at 824, the controller may pair the two commands for the fused operation, empty the data structure containing that FC, clear a bitmap indicating the storage of that FC, and similarly unlock or release the LBA range of the FW to allow subsequent overlapping commands to be processed in the flow logic of FIG. 8. Afterwards, at 826, the controller may process the fused operation associated with the FC and FW (e.g., the controller may perform the compare and write).

On the other hand, if the controller determines at 822 that validation has failed (that an FC with overlapping LBA ranges was not found in the corresponding data structure), then the FW fails due to a violation of a fused command pairing. For example, the validation may fail if the FW indicates an LBA range which only partially overlaps with that of an FC stored in the data structure, or if an FC with an overlapping LBA range is not found in the data structure. Thus, at 828, the controller may report an error to the host device that a valid pair of fused operation commands was not found, and the controller may abort the fused operation.

Figure 9A:
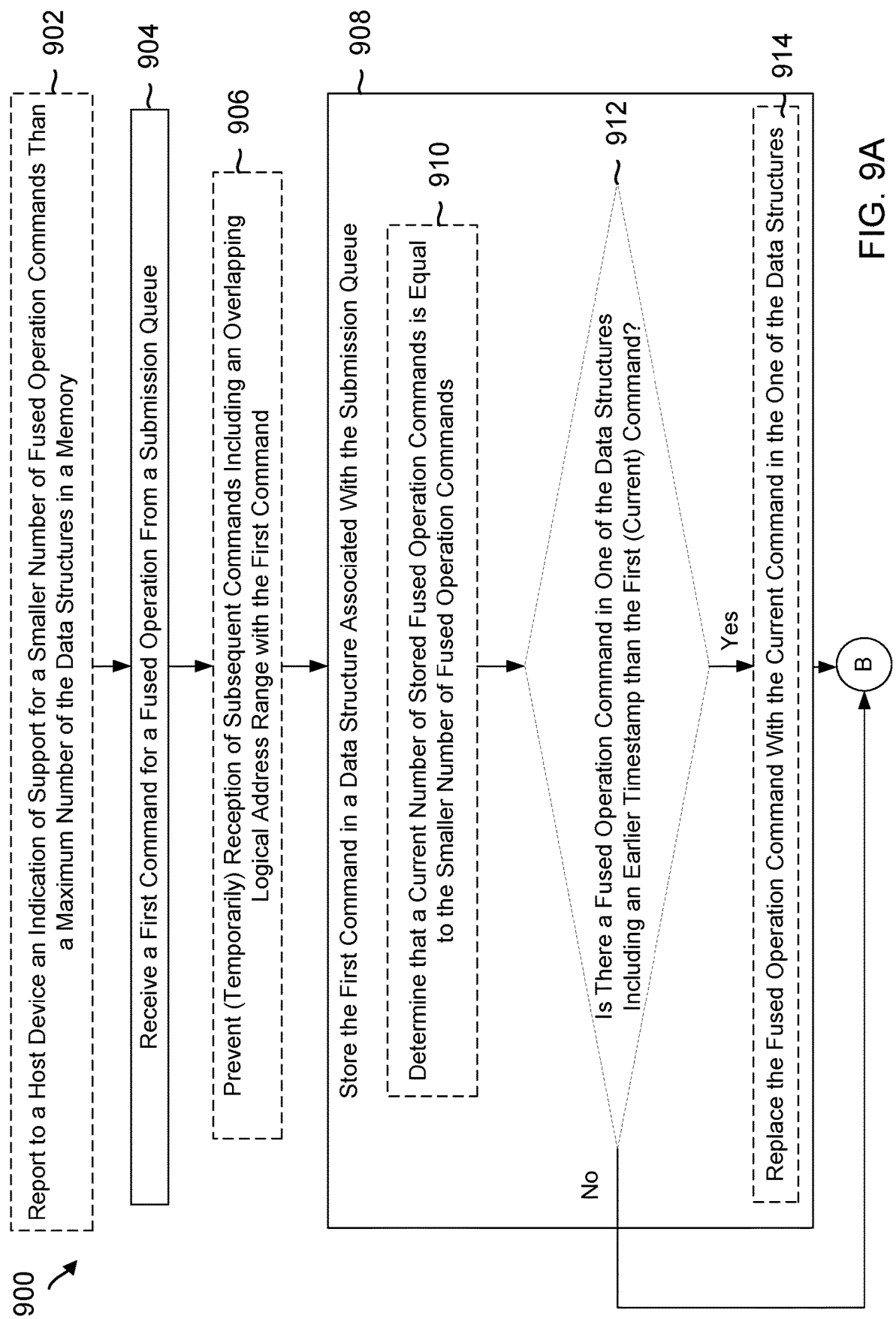
FIGS. 9A-9C are a flow chart illustrating an example of a method for handling fused commands, as performed by the storage device of FIG. 1.
Figure 9B:
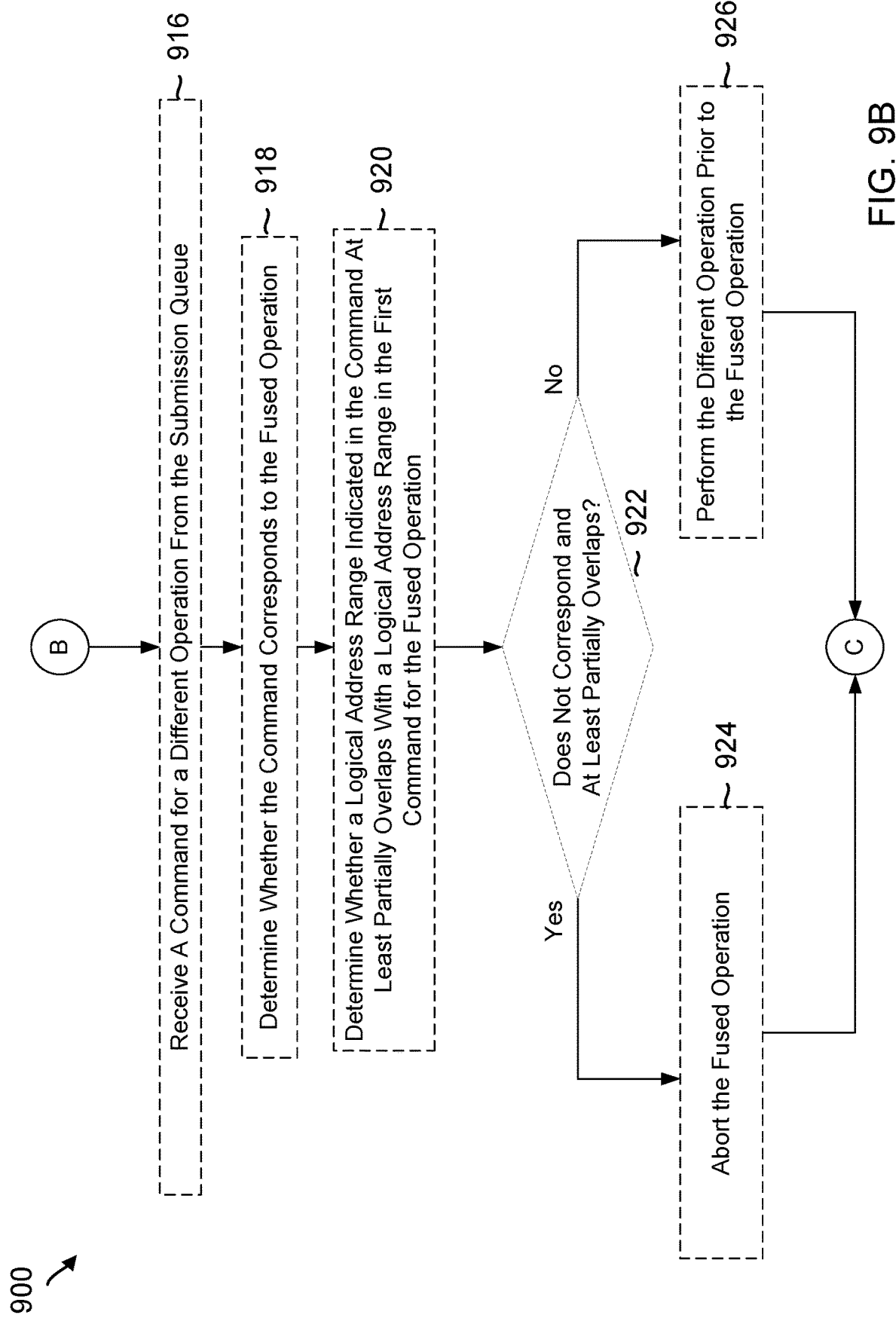
Figure 9C:
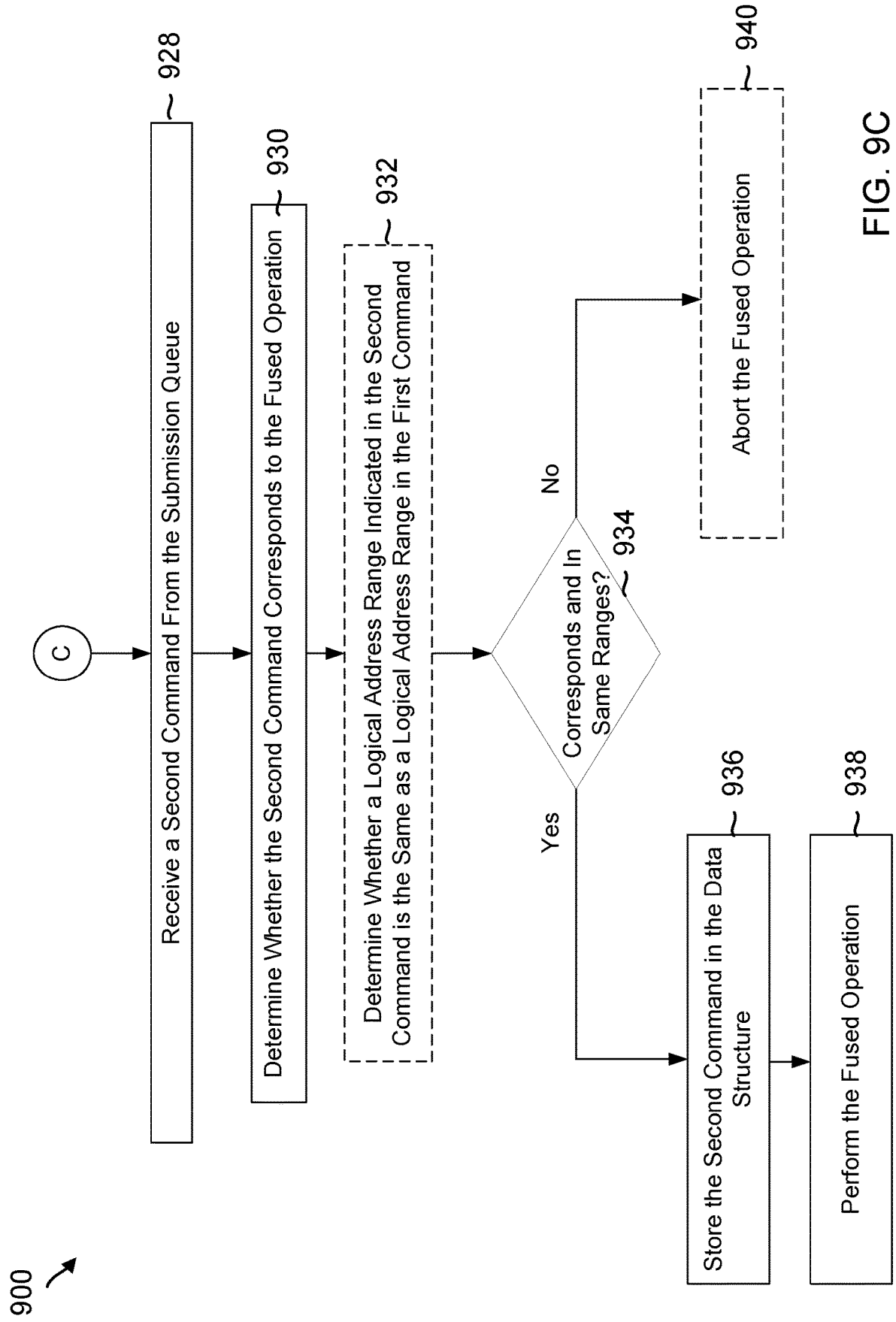

FIGS. 9A-9C are a flow chart illustrating an example 900 of a method for handling fused commands. For example, the method can be carried out in a storage device 102 such as the one illustrated in FIG. 1. Each of the steps in the flow chart can be controlled using the controller as described below (e.g. controller 123), by a component or module of the controller, or by some other suitable means. Optional aspects are illustrated in dashed lines.

Referring to FIG. 9A, as represented by block 902, the controller may report to a host device an indication of support for a smaller number of fused operation commands than a maximum number of data structures in a memory of the storage device (e.g., a volatile memory). Each of the data structures in the memory may be associated with a different submission queue for commands from the host device. The data structures may be linked lists. For instance, referring to FIGS. 6-8, the controller may report to host device 104 an indication that the controller may store one less data structure (e.g., a pseudo submission queue or linked list) or fused operation command than the controller actually supports. For example, in response to receiving an identity command or capability inquiry from the host device requesting the controller to expose or indicate to the host device its supported functionality, the controller may report to the host device that the controller only supports up to N−1 submission queues (e.g., 255 submission queues in an example) even though the controller actually supports a full N submission queues in respective data structures in its volatile memory 118 (e.g., 256 submission queues in this example). A one-to-one mapping may exist between each of the data structures 602 and the submission queues 604 containing the commands received from the host device (e.g., one data structure may be associated with each submission queue). Thus, in the example of FIG. 6, the controller may actually maintain N data structures, one for each of N submission queues, which may store fused operation commands popped from the respective submission queues.

As represented by block 904, the controller may receive a first command for a fused operation from a submission queue. For instance, the first command may be a compare command in a compare and write. For example, referring to FIG. 8, at 802, the controller may pop a command from a submission queue (e.g., in response to an indication or register write from the host device serving as a doorbell to the controller that a new command has been placed in the submission queue). As an example, referring to FIG. 6, the controller may receive CMD1 for fused operation 606 from submission queue 1, where CMD1 in this example is a compare command (a FC) and the fused operation 606 is a compare and write. In other examples, the controller may receive a FC for a different fused operation from other submission queues as the first command. For instance, CMD1 in submission queue 2 (e.g., a FC) or CMD1 in submission queue N−1 (e.g., another FC) may be the first command for other fused operations (e.g., other compare and writes).

As represented by block 906, from a time when the first command is received from the submission queue until a time when the first command is stored in the data structure (at block 908), the controller may prevent reception of subsequent commands including an overlapping logical address range with the first command. For instance, referring to FIG. 6, during the time 612 between when CMD1 (FC) is popped from submission queue 1 and when CMD1 is placed in data structure 1, the controller may prevent a race condition with CMD2 (an unrelated command) or CMD3 (FW) indicating the same LBA range as CMD1. In other words, the controller may serialize the commands to prevent the unexpected occurrence of an out-of-order situation where CMD2 or CMD3 is popped from submission queue 1 after CMD1, but is placed in data structure 1 before CMD1. Thus, the controller may ensure the first command for a fused operation (e.g., the FC) is processed first in time before the second command for that fused operation (e.g., the FW), as well as ensure that an unrelated data read or write to the same LBA ranges is not processed in an unexpected order with respect to the fused operation.

As represented by block 908, the controller may store the first command in the data structure associated with the submission queue. For instance, referring to FIG. 8, at 818, the controller may add the current command (e.g., the first command or FC) as a pending fused operation command to its corresponding data structure. For example, referring to FIG. 6, the controller may store the CMD1 (the FC) popped from submission queue 1 in data structure 1 (which is one-to-one mapped with the submission queue). Similarly, the controller may store CMD1 (another FC) popped from submission queue 2 in data structure 2, and CMD1 (another FC) popped from submission queue N−1 in data structure N−1.

Moreover, in the process of storing the first command at block 908, as represented by block 910, the controller may determine that a current number of stored fused operation commands (in the data structures) is equal to the smaller number of fused operation commands reported at block 902. If the controller determines at block 912 that there is a fused operation command in one of the data structures including an earlier timestamp than the first command (the current command), then as represented by block 914, the controller may replace the fused operation command with the current command in the one of the data structures. For instance, referring to FIG. 8, at 814, the controller may determine whether the current command may cause a deadlock in fused operations. For instance, the controller may check whether a maximum, pending number of FCs that the controller may support (e.g., N−1 FCs) has already been stored in data structures (e.g., pseudo submission queues or linked lists) associated with various submission queues. In such case, at 816, the controller may replace the oldest FC in the data structure with the current FC. For example, referring to FIG. 6, in the case of the CMD1 from submission queue N−1, the controller may receive another FC in CMD2 (serving as the first command here, or the current command). In such case, the controller may determine that current command 608 (CMD2) is another FC which overlaps with (e.g., indicates the same LBAs as) the previously stored FC (CMD1). Here, since N−1 FCs have already been stored in data structures, the controller may determine that current command 608 (the N$^{th}$ FC) would cause a deadlock if stored in its corresponding data structure. As a result, the controller replaces the previously stored FC (CMD1) in data structure N−1 with the current FC (CMD2) as illustrated, since CMD1 has an earlier timestamp 610 than CMD2. In this way, a deadlock is avoided.

Referring to FIG. 9B, as represented by block 916, the controller may receive a command for a different operation from the submission queue. For instance, the command may be for a read, a write, or some other operation unassociated with the compare and write referenced at block 904. For instance, referring to FIG. 8, at 802, the controller may pop another command from the submission queue (e.g., in response to another indication or register write from the host device serving as a doorbell to the controller that a new command has been placed in the submission queue). For example, referring to FIG. 6, after receiving CMD1 (e.g., the FC) from submission queue 1, the controller may receive CMD2 for a different operation unrelated to the fused operation 606 (e.g., a read or an unrelated write) from submission queue 1.

As represented by block 918, the controller may determine whether the command received at block 916 corresponds to the fused operation. For instance, referring to FIG. 8, at 804, the controller may determine whether the popped (current) command is a fused operation command. For example, referring to FIG. 6, the controller may check the metadata of CMD2 in submission queue 1 to identify whether the command is a FC, is a FW, or is not a fused operation command (e.g., a read or unrelated write).

Moreover, as represented by block 920, the controller may determine whether a logical address range indicated in the current command at least partially overlaps with a logical address range in the first command for the fused operation. If the controller determines at block 922 that the current command does not correspond with the fused operation but that the logical address ranges at least partially overlap, then as represented by block 924, the controller may abort the fused operation. Otherwise if the controller determines that that the current command does not correspond with the fused operation and the logical address ranges do not overlap at all, then as represented by block 926, the controller may perform the different operation prior to the fused operation. For instance, referring to FIG. 8, if the controller determines at 804 that the current command is not a fused operation command, then at 806, the controller searches the data structure (e.g., the pseudo submission queue or linked list) associated with the submission queue to check whether the current command indicates a logical address range overlapping with that of a pending fused operation command (e.g., a FC) previously stored in the data structure. Next, at 808, depending on whether the controller finds a pending fused operation command with an overlapping LBA range or not, the controller may either process the current command at 810, or report an error to the host for the pending fused operation command at 812, respectively. For example, if the linked list stores a FC for LBAs 10-15, and the current command is a read command or unrelated write command which indicates LBAs that do not overlap with any of LBAs 10-15 (not even partially), then the controller may execute the read command or unrelated write command. However, if the current command alternatively indicated LBAs that overlapped even partially with any of LBAs 10-15, then the controller may report an error to the host device for the FC and abort the fused operation due to a violation of the atomicity of a fused operation command pairing.

Referring to FIG. 9C, as represented by block 928, the controller may receive a second command from the submission queue. For instance, the second command may be a write command in the compare and write referenced at block 904. The second command may be received after the previously described command for the different operation referenced above with respect to block 916 (a third command). For instance, referring to FIG. 8, at 802, the controller may pop a further command from the submission queue (e.g., in response to a further indication or register write from the host device serving as a doorbell to the controller that a new command has been placed in the submission queue). For example, referring to the example of FIG. 6, the controller may receive CMD3 for fused operation 606 from submission queue 1, where CMD3 in this example is a write command (a FW) and the fused operation 606 is a compare and write. In this example, CMD3 may be the second command referenced at block 928, while CMD2 may be the unrelated command referenced at block 916 (the third command referenced at block 928). In other examples, the controller may receive a FW for a different fused operation from other submission queues as the second command.

As represented by block 930, the controller may determine whether the second command corresponds to the fused operation. For instance, referring to FIG. 8, at 804, the controller may determine whether the popped (current) command is a fused operation command. For example, referring to FIG. 6, the controller may check the metadata of CMD3 in submission queue 1 to identify whether the command is a FC, is a FW, or is not a fused operation command (e.g., a read or unrelated write).

Moreover, as represented by block 932, the controller may determine whether a logical address range indicated in the second command is the same as a logical address range indicated in the first command. If the controller determines at block 934 that the second command corresponds with the fused operation and that the logical address ranges are the same, then as represented by block 936, the controller may store the second command in the data structure, and as represented by block 938, the controller may perform the fused operation. For instance, referring to FIG. 8, if the controller determines at 804 that the current command is a fused operation command which is expected to occur second in time for the fused operation (e.g., a FW), then at 820, the controller may search for this overlapping fused operation command in the corresponding data structure. For instance, referring to FIG. 6, the controller may check the metadata of the CMD1 in data structure 1 and compare this metadata with the metadata of CMD3 to identify whether a valid pair exists (e.g., the LBA ranges of both commands are the same). If the controller determines that validation is successful at 822 (that an FC with overlapping LBA ranges with the current FW was found), then at 824, the controller may pair the two commands for the fused operation. For example, referring to FIG. 6, the controller may store the FW (CMD3) in data structure 1 (e.g., add CMD3 to the linked list with the FC (CMD1)). Afterwards, at 826, the controller may process the fused operation associated with the FC and FW (e.g., the controller may perform the compare and write).

Otherwise, if the controller determines at block 934 that the second command does not correspond with the fused operation or that the logical address ranges are not the same, then as represented by block 940, the controller may abort the fused operation. For example, referring to FIG. 8, if the controller determines at 822 that validation has failed (that an FC with overlapping LBA ranges was not found in the corresponding data structure), then the FW fails due to a violation of a fused command pairing. For example, the validation may fail if the FW indicates an LBA range which only partially overlaps with that of an FC stored in the data structure, or if an FC with an overlapping LBA range is not found in the data structure. Thus, at 828, the controller may report an error to the host device that a valid pair of fused operation commands was not found, and the controller may abort the fused operation.

Figure 10:
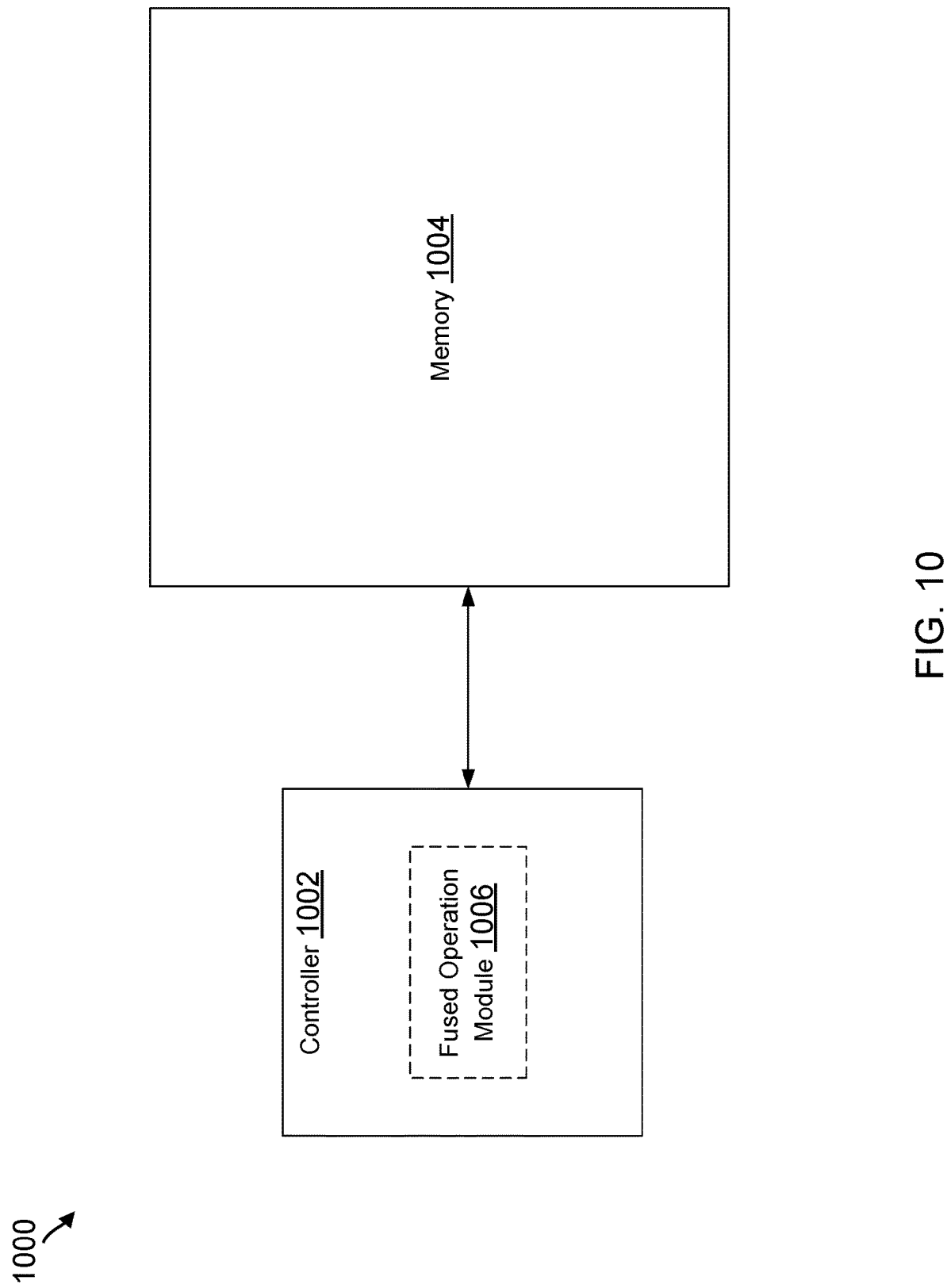
FIG. 10 is a conceptual diagram illustrating an example of a controller that handles fused commands in the storage device of FIG. 1.

FIG. 10 is a conceptual diagram illustrating an example 1000 of a controller 1002 coupled to a memory 1004 in a storage device. For example, controller 1002 may correspond to controller 123 and memory 1004 may correspond to the NVM 110 or volatile memory 118 of the storage device 102 in FIG. 1. The controller may be implemented in software, hardware, or a combination of hardware and software. In one exemplary embodiment, the controller is implemented with several software modules executed on one or more processors, but as those skilled in the art will appreciate, the controller may be implemented in different ways. The skilled artisan will readily understand how best to implement the controller based on the particular design parameters of the system.

In one example, the controller 1002 includes a fused operation module 1006 that may provide a means for performing a fused operation in response to storage of a first command and a second command for a fused operation, received from a submission queue, in a data structure associated with the submission queue. For example, the fused operation module 1006 may perform the process or algorithm described above with respect to FIGS. 9A-9C.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage device, comprising:
   a memory including a data structure, wherein the data structure is associated with a submission queue; and
   one or more processors coupled to the memory, the one or more processors, individually or in combination, configured to:
   receive a first command for a fused operation from the submission queue,
   store the first command in the data structure,
   receive a second command from the submission queue,
   determine whether the second command corresponds to the fused operation,
   determine whether a first logical address range indicated in the first command is same as a second logical address range indicated in the second command,
   store the second command in the data structure in response to determining that the second command corresponds to the fused operation and that the first logical address range and the second logical address range are the same, and
   perform the fused operation in response to storing the second command.

2. The storage device of claim 1, wherein the one or more processors, individually or in combination, are further configured to:
   prior to receiving the second command, receive a third command for a different operation from the submission queue,
   determine whether the third command corresponds to the fused operation, and
   in response to a determination that the third command does not correspond to the fused operation, perform the different operation prior to the fused operation.

3. The storage device of claim 2, wherein the one or more processors, individually or in combination, are further configured to:
   determine whether a third logical address range indicated in the third command at least partially overlaps with the first logical address range indicated in the first command for the fused operation, and
   in response to determining that the first logical address range and the third logical address range do not overlap, perform the different operation prior to the fused operation.

4. The storage device of claim 2, wherein the one or more processors, individually or in combination, are further configured to:
   determine whether a third logical address range indicated in the third command at least partially overlaps with the first logical address range indicated in the first command for the fused operation, and
   in response to a determination that the first logical address range and the third logical address range at least partially overlap, abort the fused operation.

5. The storage device of claim 1, wherein the memory includes a plurality of data structures including the data structure, and each of the data structures is associated with a different submission queue.

6. The storage device of claim 5, wherein the one or more processors, individually or in combination, are further configured to:
   report to a host device an indication that the storage device supports a smaller number of fused operation commands than a maximum number of the data structures in the memory.

7. The storage device of claim 6, wherein the first command is a current command, and the one or more processors, individually or in combination, are further configured to:
   determine that a current number of stored fused operation commands is equal to the smaller number of fused operation commands, and
   in response to a fused operation command in one of the data structures including an earlier timestamp than the current command, replace the fused operation command with the current command in the one of the data structures.

8. The storage device of claim 1, wherein the one or more processors, individually or in combination, are further configured to:
   from a time when the first command is received from the submission queue until a time when the first command is stored in the data structure, prevent reception of subsequent commands including an overlapping logical address range with the first command.

9. A storage device, comprising:
   a memory including a data structure, wherein the data structure is associated with a submission queue; and
   one or more processors coupled to the memory, the one or more processors, individually or in combination, configured to:
   receive a first command for a fused operation from the submission queue, the first command indicating a first logical address range,
   store the first command in the data structure,
   receive a second command for a different operation from the submission queue, the second command indicating a second logical address range, determine whether the second command corresponds to the fused operation, in response to determining that the second command does not correspond to the fused operation, perform the different operation prior to the fused operation, receive a third command from the submission queue, the third command indicating a third logical address range, determine whether the third command corresponds to the fused operation and the third logical address range overlaps with the first logical address range, and in response to determining that the third command corresponds to the fused operation and that the third logical address range overlaps with the first logical address range, store the third command in the data structure and perform the fused operation.

10. The storage device of claim 9, wherein the one or more processors, individually or in combination, are further configured to:

determine whether the second logical address range indicated in the second command for the different operation at least partially overlaps with the first logical address range indicated in the first command for the fused operation, and in response to determining that the second logical address range and the first logical address range at least partially overlap, abort the fused operation.

11. The storage device of claim 9, wherein the data structure is a linked list, the memory includes a plurality of linked lists including the linked list, and each of the linked lists is associated with a different submission queue.

12. The storage device of claim 11, wherein the one or more processors, individually or in combination, are further configured to:

report to a host device an indication that the storage device supports a smaller number of fused operation commands than a maximum number of the data structures in the memory, wherein the data structures are the linked lists.

13. The storage device of claim 12, wherein the one or more processors, individually or in combination, are further configured to:

determine that a current number of stored fused operation commands is equal to the smaller number of fused operation commands, and in response to a fused operation command in one of the linked lists including an earlier timestamp than the first command, replace the fused operation command with the first command in the one of the linked lists.

14. The storage device of claim 9, wherein the data structure is a linked list, and wherein the one or more processors, individually or in combination, are further configured to:

from a time when the first command is received from the submission queue until a time when the first command is stored in the linked list, prevent reception of subsequent commands including an overlapping logical address range with the first command.

15. A storage device, comprising:

a memory including a plurality of data structures, wherein each of the data structures is associated with a different submission queue; and one or more processors coupled to the memory, the one or more processors, individually or in combination, configured to:

receive a first command for a fused operation from one of the different submission queues, the first command indicating a first logical address range, store the first command in one of the data structures, receive a second command for the fused operation from the one of the different submission queues, the second command indicating a second logical address range, determine whether the second command corresponds to the fused operation and whether the first logical address range is same as the second logical address range, store the second command in the one of the data structures in response to determining that the second command corresponds to the fused operation and that the first logical address range is the same as the second logical address range, and perform the fused operation in response to storing the second command.

16. The storage device of claim 15, wherein the one or more processors, individually or in combination, are further configured to:

prior to receiving the second command, receive a third command for a different operation from the one of the different submission queues, determine whether the third command corresponds to the fused operation, and in response to a determination that the third command does not correspond to the fused operation, perform the different operation prior to the fused operation.

17. The storage device of claim 15, wherein the one or more processors, individually or in combination, are further configured to:

from a time when the first command is received from the one of the different submission queues until a time when the first command is stored in the data structure, prevent reception of subsequent commands including an overlapping logical address range with the first command.

18. The storage device of claim 15, wherein the first command is a compare command and the second command is a write command.

* * * * *